United States Patent
Suzuki

(10) Patent No.: US 11,201,996 B2
(45) Date of Patent: Dec. 14, 2021

(54) CAMERA, ACCESSORY APPARATUS, AND THEIR CONTROL METHODS

(71) Applicant: CANON KABUSHIKI KAISHA, Tokyo (JP)

(72) Inventor: Kazuto Suzuki, Saitama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/857,514

(22) Filed: Apr. 24, 2020

(65) Prior Publication Data
US 2020/0252539 A1 Aug. 6, 2020

Related U.S. Application Data

(63) Continuation of application No. PCT/JP2018/037215, filed on Oct. 4, 2018.

(30) Foreign Application Priority Data

Nov. 1, 2017 (JP) .............................. JP2017-211506

(51) Int. Cl.
*H04N 5/225* (2006.01)
*H04N 5/232* (2006.01)

(52) U.S. Cl.
CPC ..... *H04N 5/23209* (2013.01); *H04N 5/23241* (2013.01)

(58) Field of Classification Search
None
See application file for complete search history.

(56) References Cited

U.S. PATENT DOCUMENTS

| 6,029,017 A | 2/2000 | Miyazawa |
| 2013/0022348 A1* | 1/2013 | Hasuda ................ G03B 17/565 |
| | | 396/530 |

(Continued)

FOREIGN PATENT DOCUMENTS

| CN | 103327579 A | 9/2013 |
| CN | 105591760 A | 5/2016 |

(Continued)

OTHER PUBLICATIONS

English translation of Written Opinion issued in Intl. Appln. No. PCT/JP2018/037215 dated Jan. 8, 2019, previously cited in IDS filed Apr. 24, 2020.

(Continued)

*Primary Examiner* — Twyler L Haskins
*Assistant Examiner* — Dwight Alex C Tejano
(74) *Attorney, Agent, or Firm* — Rossi, Kimms & McDowell LLP

(57) ABSTRACT

A camera is usable while a plurality of accessory apparatuses are connected to the camera. The camera includes a camera communication unit connected to a data communication channel used for a data communication between the camera and each of the plurality of accessory apparatuses, and a camera controller configured to perform the data communication with each of the plurality of accessory apparatuses via the data communication channel. The camera controller transmits to at least one sleep target accessory apparatus among the plurality of accessory apparatuses which is selected based on authentication information acquired from each of the plurality of accessory apparatuses, a sleep request command for shifting the sleep target accessory apparatus from an operation state for performing processing in response to a data transmission from the camera (Continued)

to a sleep state that does not perform the processing regardless of the data transmission.

18 Claims, 13 Drawing Sheets

(56) References Cited

U.S. PATENT DOCUMENTS

| | | | |
|---|---|---|---|
| 2013/0028590 A1* | 1/2013 | Hasuda | H04N 5/232 |
| | | | 396/530 |
| 2013/0077952 A1* | 3/2013 | Sugiyama | G03B 17/56 |
| | | | 396/530 |
| 2015/0095537 A1 | 4/2015 | Sengoku | |
| 2017/0237902 A1* | 8/2017 | Watanabe | H04N 5/232411 |
| | | | 348/372 |
| 2018/0224720 A1* | 8/2018 | Pan | G03B 17/14 |
| 2019/0306392 A1* | 10/2019 | Imamura | G02B 7/02 |

FOREIGN PATENT DOCUMENTS

| | | |
|---|---|---|
| CN | 105612506 A | 5/2016 |
| CN | 105659159 A | 6/2016 |
| CN | 108322444 A | 7/2018 |
| EP | 3229461 A2 | 10/2017 |
| JP | 2013047770 A | 3/2013 |
| JP | 2016095524 A | 5/2016 |
| JP | 2017161922 A | 9/2017 |
| JP | 2017181980 A | 10/2017 |

OTHER PUBLICATIONS

International Preliminary Report on Patentability issued in Intl. Appln. No. PCT/JP2018/037215 dated May 14, 2020. English translation provided.
International Search Report issued in Intl. Appln. No. PCT/JP2018/037215 dated Jan. 8, 2019. English translation provided.
Written Opinion issued in Intl. Appln. No. PCT/JP2018/037215 dated Jan. 8, 2019.
NXP Semiconductors. "NXP materials: I2C bus specification and user manual." UM10204. Rev. Apr. 6-4, 2014. pp. 1-64. Includes translation of NXP materials: I2C bus specification and user manual Rev5.0J-2—Oct. 9, 2012 [May 20, 2017 Internet search URL: http://www.nxp.com/documents/user_manual/UM10204_JA.pdf]. Cited in Specification.
Extended European Search Report issued in European Appln. No. 18874409.8 dated Jun. 30, 2021.
Office Action issued in Chinese Appln. No. 201880069947.4 dated Apr. 25, 2021. English translation provided.
Office Action issued in Chinese Appln. No. 201880069947.4 dated Sep. 3, 2021.

* cited by examiner

CAMERA, ACCESSORY APPARATUS, AND THEIR CONTROL METHODS

CROSS-REFERENCE TO RELATED APPLICATIONS

This application is a Continuation of International Patent Application No. PCT/JP2018/037215, filed on Oct. 4, 2018, which claims the benefit of Japanese Patent Application No. 2017-211506, filed on Nov. 1, 2017, both of which are hereby incorporated by reference herein in their entirety.

BACKGROUND OF THE INVENTION

Field of the Invention

The present invention relates to an image pickup (camera) system that includes a camera (image pickup apparatus; referred to as a camera body hereinafter) and an accessory apparatus, such as an interchangeable lens and an adapter, which can communicate with each other.

Description of the Related Art

In an interchangeable lens type camera system including a camera body to which an interchangeable lens is detachably attachable, a communication is performed for the camera body to control the operation of the interchangeable lens and for the interchangeable lens to provide the camera body with data necessary for its control and imaging. In particular, in imaging a recording use motion image and a live-view display use motion image with the interchangeable lens, a smooth lens control is required at an imaging cycle, so it is necessary to synchronize the imaging timing of the camera body and the control timing of the interchangeable lens with each other. Thus, the camera body needs to complete a data reception from the interchangeable lens and a transmission of a command, such as a variety of instructions and requests, to the interchangeable lens within the imaging cycle. However, as a data amount received by the camera body from the interchangeable lens becomes larger or the imaging cycle becomes shorter (or the frame rate becomes higher), a communication of a large amount of data at higher speed is required.

An adapter such as a wide converter or a teleconverter (extender) may be connected between the camera body and the interchangeable lens, and this type of adapter also communicates with the camera body similar to the interchangeable lens. Hence, the camera system requires a communication system in which the camera body can perform a one-to-many communication with a plurality of accessory apparatuses including the interchangeable lens and the adapter. As a communication method for realizing the one-to-many communication between a communication master and a plurality of communication slaves, there is an I2C communication method disclosed in NXP materials: I2C bus specification and user manual Rev5.0J-2-Oct. 9, 2012 [May 20, 2017 Internet search URL: http://www.nxp.com/documents/user_manual/UM10204_JA.pdf].

However, the address of the communication slave that can be specified by the I2C bus is fixed for each communication slave or selected by the user from a slight width (about several bits) by hardware. In any of these cases, the communication master needs to previously recognize the addresses of a plurality of communication slaves connected to it.

On the other hand, in a camera system that can connect in series a plurality of accessory apparatuses as the communication slaves, the camera body as the communication master may not previously know what types of accessory apparatuses and how many accessory apparatuses (such as newly used ones) are connected. In this case, assume that addresses of 0 to n are assignable to the communication slaves. A camera body that does not know type(s) and number of connected accessory apparatuses needs to perform an authentication communication to authenticate (confirm) the accessory apparatus for all addresses from 0 to n including an address where no accessory apparatus exists. As a result, it takes a long time for the authentication communication, and the start of imaging by the camera system is delayed. At this time, if an accessory apparatus is incompatible with the camera body (incompatible accessory apparatus) or a plurality of accessory apparatuses exceeding the permissible number are connected to the camera body, malfunctions or communication failures of the image pickup system may occur.

SUMMARY OF THE INVENTION

The present invention provides an image pickup system capable of avoiding a malfunction, a communication failure, and the like.

A camera according to one aspect of the present invention is usable while a plurality of accessory apparatuses are connected to the camera. The camera includes a camera communication unit connected to a data communication channel used for a data communication between the camera and each of the plurality of accessory apparatuses, and a camera controller configured to perform the data communication with each of the plurality of accessory apparatuses via the data communication channel. The camera controller transmits to at least one sleep target accessory apparatus among the plurality of accessory apparatuses through the data communication, a sleep request command for shifting the sleep target accessory apparatus from an operation state for performing processing in response to a data transmission from the camera to a sleep state that does not perform the processing regardless of the data transmission.

An accessory apparatus according to another aspect of the present invention among a plurality of accessory apparatuses is connectable to a camera usable while the plurality of accessory apparatuses are connected to the camera. The accessory apparatus includes an accessory communication unit connected to a data communication channel used for a data communication between the camera and each of the plurality of accessory apparatuses, and an accessory controller configured to perform the data communication with the camera via the data communication channel. When receiving a sleep request command from the camera via the data communication, the accessory controller shifts from an operation state for performing processing in response to a data transmission from the camera to a sleep state that does not perform the processing regardless of the data transmission.

A control method according to one aspect of the present invention is applied to a camera usable while a plurality of accessory apparatuses are connected to the camera and configured to perform a data communication with each of the plurality of accessory apparatuses via a data communication channel. The control method includes the step of causing the camera to transmit to at least one sleep target accessory apparatus among the plurality of accessory apparatuses through the data communication, a sleep request command for shifting the sleep target accessory apparatus from an operation state for performing processing in response to a data transmission from the camera to a sleep state that does not perform the processing regardless of the data transmission.

A control method according to another aspect of the present invention is applied to an accessory apparatus among a plurality of accessory apparatuses connectable to a camera usable while the plurality of accessory apparatuses are connected to the camera, and configured to perform the data communication with the camera via the data communication channel. The control method includes the step of causing the accessory apparatus to shift, when receiving a sleep request command from the camera via the data communication, from an operation state for performing processing in response to a data transmission from the camera to a sleep state that does not perform the processing regardless of the data transmission.

A control program that is a computer program that causes a computer in the camera or the accessory apparatus to operate in accordance with the above control method also constitutes another aspect of the present invention.

Further features of the present invention will become apparent from the following description of exemplary embodiments with reference to the attached drawings.

DESCRIPTION OF THE EMBODIMENTS

Referring now to the accompanying drawings, a description will be given of embodiments according to the present invention.

First Embodiment

Figure 1:
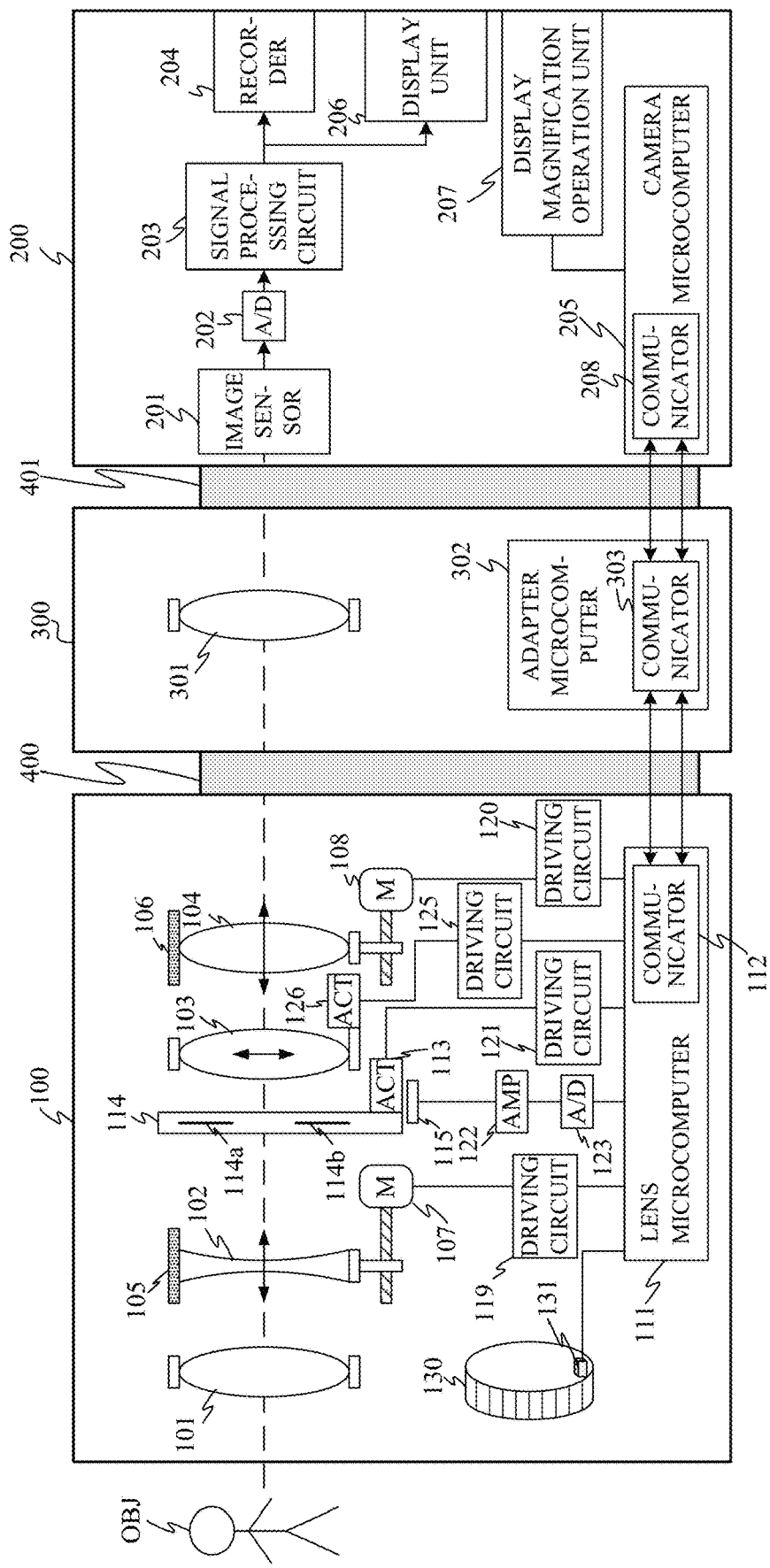
FIG. 1 is a block diagram showing a configuration of a camera system according to a first embodiment of the present invention.

FIG. 1 illustrates a configuration of an image pickup system (referred to as a camera system hereinafter) according to a first embodiment of the present invention that includes a camera (image pickup apparatus; referred to as a camera body hereinafter) 200, and an interchangeable lens 100 and an intermediate adapter apparatus (simply referred to as an adapter hereinafter) 300 as accessory apparatuses. This embodiment illustrates the camera body 200 usable while the interchangeable lens 100 is connected via the adapter 300 (while a plurality of accessory apparatuses are connected).

While FIG. 1 illustrates an illustrative camera system in which a single adapter 300 is connected between the camera body 200 and the interchangeable lens 100, a plurality of adapters may be connected in series between the camera body 200 and the interchangeable lens 100.

The camera system according to this embodiment performs communications among the camera body 200, the interchangeable lens 100, and the adapter 300 using a plurality of communication methods. The camera body 200, the interchangeable lens 100, and the adapter 300 transmit control commands and data (information) through their respective communicators. In addition, each communicator supports a plurality of communication methods, and can select an optimal communication method in a variety of situations by switching to the common communication method in synchronization with each other according to the type of data to be communicated and the purpose of communication.

A description will now be given of a more specific configuration of the interchangeable lens 100, the camera body 200, and the adapter 300.

The interchangeable lens 100 and the adapter 300 are mechanically and electrically connected via a mount 400 as a coupling mechanism. Similarly, the adapter 300 and the camera body 200 are mechanically and electrically connected via a mount 401 as a coupling mechanism. The interchangeable lens 100 and the adapter 300 obtain the electric power from the camera body 200 through power supply terminal portions (not shown) provided to the mounts 400 and 401. Then, the power is suppled which is necessary for operations of a variety of actuators, a lens microcomputer 111, and an adapter microcomputer 302 as described later. The interchangeable lens 100, the camera body 200, and the adapter 300 communicate with each other through communication terminal portions (illustrated in FIG. 2) provided to the mounts 400 and 401.

The interchangeable lens 100 includes an image pickup optical system. The image pickup optical system includes, in order from an object OBJ side, a field lens 101, a magnification varying lens 102 that changes a magnification, a diaphragm unit 114 that adjusts a light amount. The image pickup optical system further includes an image stabilization lens 103 configured to reduce (correct) an image blur, and a focus lens 104 used for focusing.

The zoom lens 102 and the focus lens 104 are held by lens holding frames 105 and 106, respectively. The lens holding frames 105 and 106 are movably guided in an optical axis direction (indicated by a broken line in the figure) by unillustrated guide shafts, and are driven in the optical axis direction by stepping motors 107 and 108. The stepping motors 107 and 108 move the zoom lens 102 and the focus lens 104 in synchronization with a driving pulse, respectively.

The image stabilization lens 103 shifts in a direction orthogonal to the optical axis in the image pickup optical system to reduce image blurs caused by a camera shake such as a manual shake.

A lens microcomputer 111 serves as a lens controller (accessory controller) that controls the operation of each component in the interchangeable lens 100. The lens microcomputer 111 receives a control command and a transmission request command transmitted from the camera body 200 via a lens communicator (accessory communicator) 112 including a lens communication interface circuit. The lens microcomputer 111 performs a lens control corresponding to the control command, and transmits lens data corresponding to the transmission request command to the camera body 200 via the lens communicator 112.

The lens microcomputer 111 outputs a driving signal to a zoom driving circuit 119 and a focus driving circuit 120 in response to a command relating to a magnification variation and focusing among the control commands to drive the stepping motors 107 and 108. This configuration can provide zoom processing for controlling the magnification varying operation with the zoom lens 102 and AF (autofocus) processing for controlling the focusing operation with the focus lens 104.

The diaphragm unit 114 includes aperture blades 114a and 114b. The states (positions) of the aperture blades 114a and 114b are detected by a Hall element 115. The output from the Hall element 115 is input to the lens microcomputer 111 via an amplifier circuit 122 and an A/D conversion circuit 123. The lens microcomputer 111 outputs a driving signal to a diaphragm driving circuit 121 based on an input signal from the A/D conversion circuit 123 to drive a diaphragm actuator 113. Thereby, a light amount adjustment operation by the diaphragm unit 114 is controlled.

The lens microcomputer 111 controls an image stabilization actuator (voice coil motor etc.) 126 via an image stabilization driving circuit 125 in accordance with the camera shake detected by a shake sensor (not shown) such as a vibration gyro provided in the interchangeable lens 100. Thereby, the image stabilization processing for controlling the shift operation (image stabilization operation) of the image stabilization lens 103 is performed.

The interchangeable lens 100 includes a manual operation ring (simply referred to as an operation ring hereinafter) 130 and an operation ring detector 131. The operation ring detector 131 includes, for example, two photo-interrupters that output two-phase signals in accordance with a rotation of the operation ring 130. The lens microcomputer 111 can detect the rotational operation amount of the operation ring 130. The lens microcomputer 111 can notify the camera microcomputer 205 of the rotational operation amount of the operation ring 130 via the lens communicator 112.

The adapter 300 includes, for example, an extender for changing a focal length, and includes a magnification varying lens 301 and an adapter microcomputer 302. The adapter microcomputer 302 is an adapter controller (accessory controller) that controls the operation of each component in the adapter 300. The adapter microcomputer 302 receives a control command and a transmission request command transmitted from the camera body 200 via an adapter communicator (accessory communicator) 303 including a communication interface circuit. The adapter microcomputer 302 performs an adapter control corresponding to the control command, and transmits adapter data corresponding to the transmission request command to the camera body 200 via the adapter communicator 303.

The camera body 200 includes an image sensor 201, such as a CCD sensor or a CMOS sensor, an A/D conversion circuit 202, a signal processing circuit 203, a recorder 204, a camera microcomputer 205, and a display unit 206.

The image sensor 201 photoelectrically converts an object image formed by the image pickup optical system in the interchangeable lens 100 and outputs an electrical signal (analog signal). The A/D conversion circuit 202 converts the analog signal from the image sensor 201 into a digital signal. The signal processing circuit 203 performs various types of image processing for the digital signal from the A/D conversion circuit 202 and generates an image signal. The signal processing circuit 203 also generates, from the image signal, focus information indicating a contrast state of an object image (focus state of the image pickup optical system) and luminance information indicating an exposure state. The signal processing circuit 203 outputs the image signal to the display unit 206, and the display unit 206 displays the image signal as a live-view image used for a confirmation of a composition, a focus state, etc.

A camera microcomputer 205 as a camera controller controls the camera body 200 in accordance with an input from a camera operation member, such as an unillustrated imaging instructing switch and a variety of setting switches. The camera microcomputer 205 transmits a control command relating to the magnification varying operation of the zoom lens 102 to the lens microcomputer 111 in accordance with the operation of an unillustrated zoom switch via the camera communicator 208 including the communication interface circuit. Moreover, the camera microcomputer 205 transmits, to the lens microcomputer 111 via the camera communicator 208, a control command relating to the light amount adjustment operation of the diaphragm unit 114 in accordance with the luminance information and the focusing operation of the focus lens 104 in accordance with the focus information. The camera microcomputer 205 transmits a transmission request command for acquiring the control information and status information of the interchangeable lens 100 to the lens microcomputer 111, if necessary. Further, the camera microcomputer 205 transmits to the adapter microcomputer 302 a transmission request command for acquiring the control information and status information of the adapter 300.

Figure 2:
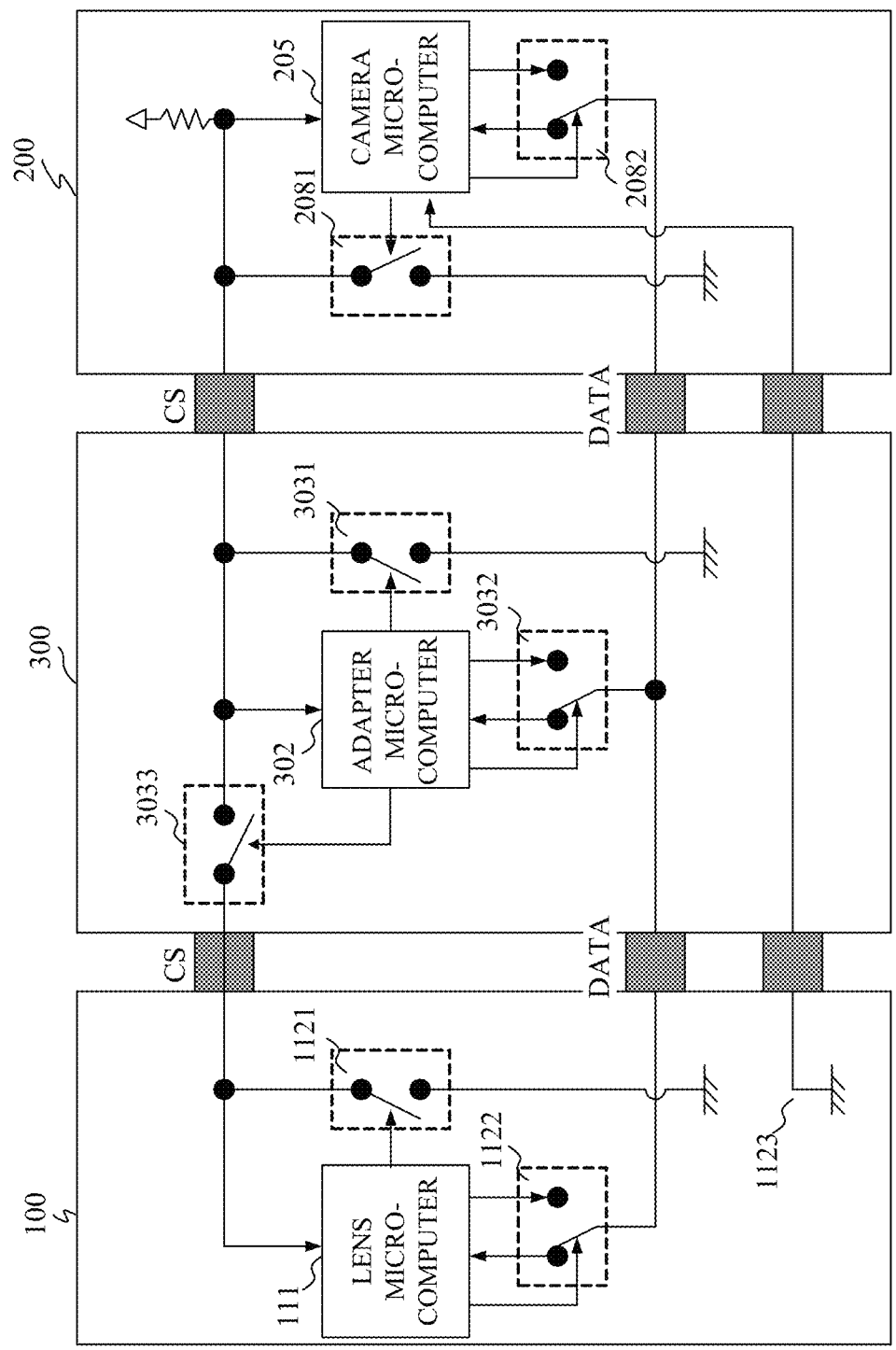
FIG. 2 is a diagram showing communication circuits of a camera body (camera microcomputer), an interchangeable lens (lens microcomputer), and an adapter (adapter microcomputer) according to the first embodiment.

Referring now to FIG. 2, a description will be given of a communication circuit configured among the camera body 200 (camera microcomputer 205), the interchangeable lens 100 (lens microcomputer 111), and the adapter 300 (adapter microcomputer 302). The camera microcomputer 205, the lens microcomputer 111, and the adapter microcomputer 302 achieve communications using signal lines connected via communication terminal portions provided on the mounts 400 and 401.

The signal lines include a signal line (first signal line corresponding to a signal transmission channel) CS that communicates a signal for a communication control, and a signal line (second signal corresponding to a data communication channel) DATA for a data communication.

The signal line CS is connected to the camera microcomputer 205, the adapter microcomputer 302, and the lens microcomputer 111. Therefore, the camera microcomputer 205, the adapter microcomputer 302, and the lens microcomputer 111 can detect high and low levels of the state of the signal line CS. The signal line CS is pulled up to an unillustrated power source in the camera body 200. The signal line CS can be connected to a ground GND (open drain connection) via a ground switch 1121 in the interchangeable lens 100, a ground switch 2081 in the camera body 200, and a ground switch 3031 in the adapter 300.

Due to this configuration, the camera microcomputer 205, the adapter microcomputer 302, and the lens microcomputer 111 can put the signal line CS into low by turning on (connecting) the ground switches 2081, 1121, and 3031, respectively. In addition, the camera microcomputer 205, the adapter microcomputer 302, and the lens microcomputer 111 can put the signal line CS into high by turning off (disconnect) the ground switches 2081, 1121, and 3031, respectively. Furthermore, a CS switch (channel switch) 3033 is provided in the adapter 300. The adapter microcomputer 302 can connect and disconnect the signal line CS by switching the CS switch 3033 between the connected state and the disconnected state. In the disconnected state of the CS switch 3033, the signal output state from the camera side (camera body 200 in this embodiment) of the adapter 300 to the signal line CS and the signal output state from the adapter 300 to the signal line CS are not transmitted to the interchangeable lens side (interchangeable lens 100 in this embodiment). In other words, the broadcast communication described later is unavailable from the adapter 300 to the communication slave on the interchangeable lens side.

A detailed description will be given later of a communication control signal (instruction or notification) transmitted through the signal line CS and its output processing.

The signal line DATA is a single-wire bidirectional data communication line that can be used by switching the data transmission direction. The signal line DATA is connectable to the lens microcomputer 111 via an input/output switch 1122 in the interchangeable lens 100, and connectable to the camera microcomputer 205 via an input/output switch 2082 in the camera body 200. The signal line DATA is connectable to the adapter microcomputer 302 via an input/output switch 3032 in the adapter 300. Each microcomputer includes a CMOS type data output part for transmitting data and a CMOS type data input part for receiving data (none of which is shown). Each microcomputer can select whether the signal line DATA is connected to the data output part or the data input part, by switching the input/output switch.

Each of the camera microcomputer 205, the adapter microcomputer 302, and the lens microcomputer 111 when transmitting data sets the input/output switch so as to connect the signal line DATA to the data output part. Each of the camera microcomputer 205, the adapter microcomputer 302, and the lens microcomputer 111 when receiving data sets an input/output switch so as to connect the signal line DATA to the data input part. Details of the input/output switching processing of the signal line DATA will be described later.

FIG. 2 illustrates an illustrative communication circuit, but another communication circuit may be used. For example, the signal line CS may be pulled down to GND in the camera body 200 and connected to an unillustrated power supply via the ground switch 1121 in the interchangeable lens 100, the ground switch 2081 in the camera body 200, and the ground switch 3031 in the adapter 300. In the interchangeable lens 100, the camera body 200, and the adapter 300, the signal line DATA may be always connected to the data input part, and the connection and disconnection between the signal line DATA and the data output part may be selected by a switch.

[Communication Data Format]

Figure 3:
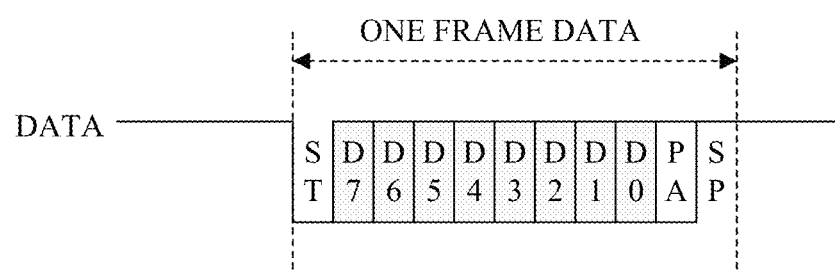
FIG. 3 is a diagram showing a communication format according to the first embodiment.

Referring now to FIG. 3, a description will be given of a format of communication data exchanged among the camera body 200 (camera microcomputer 205), the interchangeable lens 100 (lens microcomputer 111), and the adapter 300 (adapter microcomputer 302). This communication data format is common to the broadcast communication, which is a first communication described later, and the P2P communication, which is a second communication. A description will now be given of a communication data format in a so-called asynchronous communication in which a communication speed used for a communication among the microcomputers are previously determined and the transmission and reception are performed at a communication bit rate in accordance with the protocol.

Initially, in a non-transmission state that transmits no data, the signal level is maintained high. Next, in order to notify the data reception side of a start of the data transmission, the signal level is set to be low for one bit period. This one bit period will be referred to as a start bit ST. Next, one-byte data is transmitted for an eight-bit period from the next second bit to the ninth bit. The bit arrangement of the data starts with the most significant data D7 in the MSB first format, continues with data D6, data D5, . . . , Data D1, and ends with the least significant data D0. In the tenth bit, one-bit parity PA information is added, and one frame level starting from the start bit ST is completed by finally putting the signal level into high during a stop bit SP period indicating the end of the transmission data.

FIG. 3 illustrates an illustrative communication data format, but another communication data format may be used. For example, the bit arrangement of the data may be the LSB first or the nine-bit length, or no parity PA information need not be added. The communication data format may be switched between broadcast communication and the P2P communication.

[Broadcast Communication]

Next follows a description of the broadcast communication (first communication). The broadcast communication is the one-to-many communication in which one of the camera microcomputer 205, the lens microcomputer 111, and the adapter microcomputer 302 transmits data to the other two at the same time (i.e., simultaneous transmission). This broadcast communication is performed using the signal line CS and the signal line DATA. A communication mode in which the broadcast communication is performed is also referred to as a broadcast communication mode (first communication mode).

Figure 4:
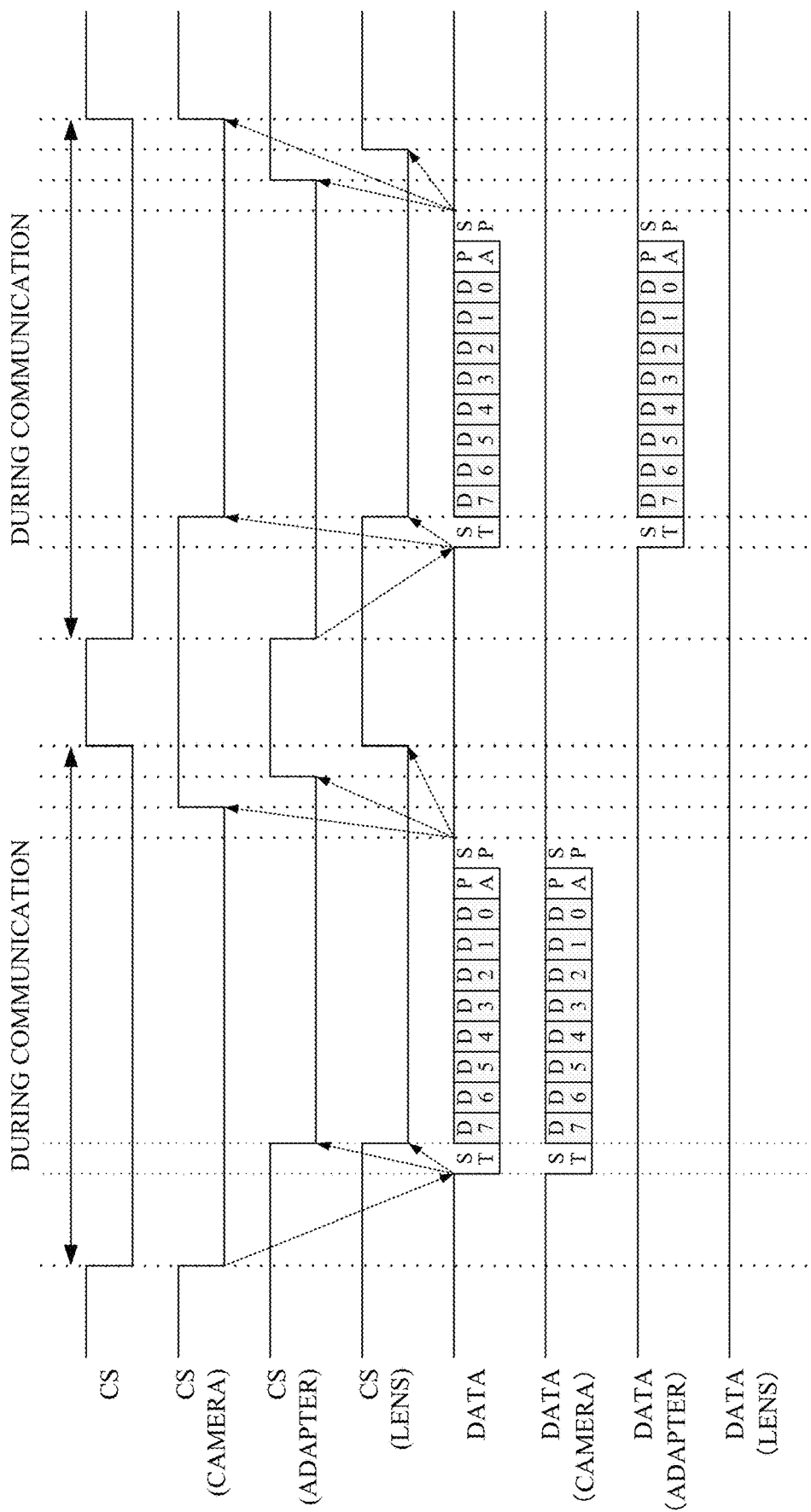
FIG. 4 is a diagram showing communication waveforms in a broadcast communication according to the first embodiment.

FIG. 4 illustrates signal waveforms in the broadcast communication among the camera microcomputer 205, the lens microcomputer 111, and the adapter microcomputer 302. Here is an example in which the adapter microcomputer 302 performs the broadcast communication to the camera microcomputer 205 and the lens microcomputer 111 in response to the broadcast communication from the camera microcomputer 205 to the lens microcomputer 111 and the adapter microcomputer 302.

Initially, the camera microcomputer 205 as a communication master starts the low output to the signal line CS in order to notify the lens microcomputer 111 and the adapter microcomputer 302 as communication slaves that the broadcast communication is to be started. Next, the camera microcomputer 205 outputs data to be transmitted, to the signal line DATA. On the other hand, the lens microcomputer 111 and the adapter microcomputer 302 start the low output to the signal line CS when detecting the start bit ST input from the signal line DATA. At this time, since the camera microcomputer 205 has already started the low output to the signal line CS, the signal level of the signal line CS does not change.

Thereafter, the camera microcomputer 205 stops the low output to the signal line CS after the stop bit SP is output. On the other hand, after receiving the stop bit SP input from the signal line DATA, the lens microcomputer 111 and the adapter microcomputer 302 analyze the received data and perform internal processing associated with the received data. When the preparation for receiving the next data is completed, the low output to the signal line CS is stopped. As described above, the signal level of the signal line CS becomes high when all of the camera microcomputer 205, the lens microcomputer 111, and the adapter microcomputer 302 stop the low output to the signal line CS. Thus, each of the camera microcomputer 205, the lens microcomputer 111, and the adapter microcomputer 302 can confirm that the signal level of the signal line CS becomes high after stopping the low output to the signal line CS. When each of the camera microcomputer 205, the lens microcomputer 111, and the adapter microcomputer 302 confirms that the signal level of the signal line CS has become high, it can determine that the current communication processing is completed and it is ready for the next communication.

Next, when confirming that the signal level of the signal line CS has returned to the high level, the adapter microcomputer 302 starts the low output to the signal line CS in order to notify the camera microcomputer 205 and the lens microcomputer 111 that the broadcast communication is to be started.

Next, the adapter microcomputer 302 outputs the data to be transmitted, to the signal line DATA. The camera microcomputer 205 and the lens microcomputer 111 start the low output to the signal line CS when detecting the start bit ST input from the signal line DATA. Since the adapter microcomputer 302 has already started the low output to the signal line CS at this time, the signal level propagated to the signal line CS does not change. Thereafter, the adapter microcomputer 302 stops the low output to the signal line CS when it completes outputting the stop bit SP. On the other hand, after receiving up to the stop bit SP input from the signal line DATA, the camera microcomputer 205 and the lens microcomputer 111 analyze the received data and perform internal processing associated with the received data. Then, after the preparation for receiving the next data is completed, the low output to the signal line CS is stopped.

As described above, the signal transmitted through the signal line CS in the broadcast communication serves as a signal indicating the start (execution) and the ongoing execution of the broadcast communication.

FIG. 4 illustrates an illustrative broadcast communication, but another broadcast communication may be performed. For example, the data transmitted in a single broadcast communication may be one-byte data as illustrated in FIG. 4, but may be two-byte or three-byte data. The broadcast communication may be a one-way communication from the camera microcomputer 205 serving as a communication master to the lens microcomputer 111 and adapter microcomputer 302 serving as communication slaves.

[P2P Communication]

Next follows a description of the P2P communication performed among the camera body 200 (camera microcomputer 205), the interchangeable lens 100 (lens microcomputer 111), and the adapter 300 (adapter microcomputer 302). The P2P communication is a one-to-one communication (individual communication) in which the camera body 200 as the communication master designates (selects) a single communication counterpart (specific accessory apparatus) among the interchangeable lens 100 and the adapter 300 as the communication slaves, and communicates data with only the designated communication slave. This P2P communication is also performed using the signal line CS and the signal line DATA. A communication mode in which the P2P communication is performed will be also referred to as a P2P communication mode (second communication mode).

Figure 5:
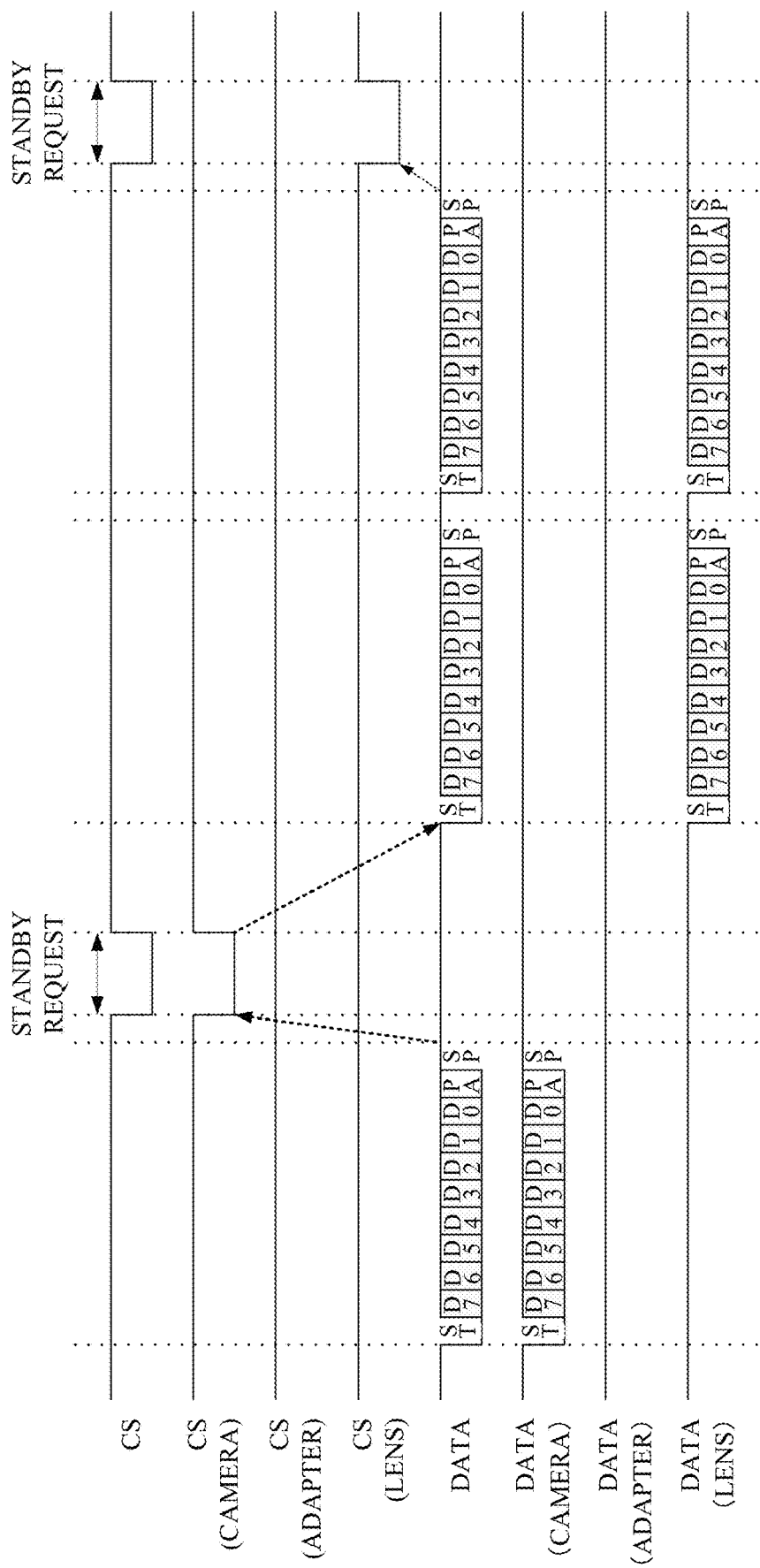
FIG. 5 is a diagram showing communication waveforms in a P2P communication according to the first embodiment.

FIG. 5 illustrates, in an example, signal waveforms of the P2P communication exchanged between the camera microcomputer 205 and the lens microcomputer (specific accessory apparatus) 111 designated as the communication counterpart. In response to one-byte data transmission from the camera microcomputer 205, the lens microcomputer 111 transmits two-byte data to the camera microcomputer 205. Communication mode switching processing (between the broadcast communication mode and the P2P communication mode) and processing for designating the communication counterpart in the P2P communication will be described later.

Initially, the camera microcomputer 205 as the communication master outputs data to be transmitted to the lens microcomputer 111, to the signal line DATA. The camera microcomputer 205 starts the low output (standby request) to the signal line CS after completing the output of the stop bit SP. After the camera microcomputer 205 is ready to receive the next data, the camera microcomputer 205 stops the low output to the signal line CS. On the other hand, after detecting the low signal input from the signal line CS, the lens microcomputer 111 analyzes the received data input from the signal line DATA and performs internal processing associated with the received data. Thereafter, when confirming that the signal level of the signal line CS has returned to the high level, the lens microcomputer 111 continuously outputs two-byte data to be transmitted, to the signal line DATA.

The lens microcomputer 111 starts the low output to the signal line CS after completing the output of the stop bit SP of the second byte. Thereafter, when becoming ready to receive the next data, the lens microcomputer 111 stops the low output to the signal line CS. The adapter microcomputer 302 that is not designated as the communication counterpart for the P2P communication does not output the signal to the signal line CS or the signal line DATA.

As described above, the signal transmitted through the signal line CS in the P2P communication serves as a notification signal indicating the end of the data transmission and a standby request for the next data transmission.

While FIG. 5 illustrates the illustrative P2P communication, another P2P communication may be used. For example, data may be transmitted every one byte at a time using the signal line DATA, or data may be transmitted every three bytes or more.

[Communication Mode Switching Processing and Communication Counterpart Designating Processing]

Figure 6:
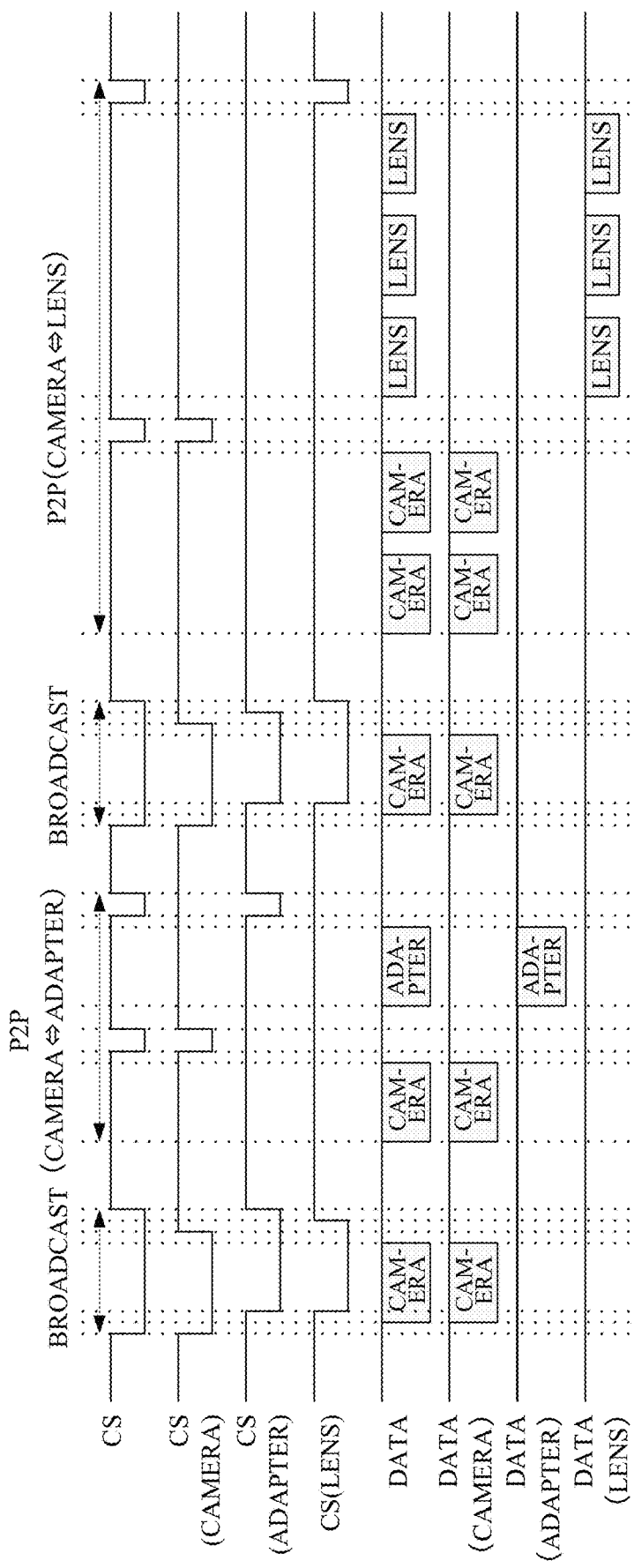
FIG. 6 is a diagram showing communication waveforms when the communication mode is switched in the first embodiment.

Referring now to FIG. 6, a description will be given of the communication mode switching processing and the communication counterpart designating processing in the P2P communication. FIG. 6 illustrates signal waveforms during the communication mode switching and communication counterpart designating, which are exchanged among the camera microcomputer 205, the lens microcomputer 111, and the adapter microcomputer 302. The communication counterpart of the P2P communication is designated by the broadcast communication. In this illustrative description, the adapter microcomputer 302 is designated as the communication counterpart of the P2P communication by the camera microcomputer 205, and one-byte data P2P communication from the camera microcomputer 205 and one-byte data P2P communication from the adapter microcomputer 302 are executed. Thereafter, the lens microcomputer 111 is designated as the communication counterpart of the P2P communication by the camera microcomputer 205, and two-byte data P2P communication from the camera microcomputer 205 and three-byte data P2P communication from the lens microcomputer 111 are executed.

Initially, the camera microcomputer 205 which is the communication master executes the broadcast communication according to the procedure described in FIG. 4. What is notified by this broadcast communication is slave designation data for designating the communication counterpart with the camera microcomputer 205 in the next P2P communication. The lens microcomputer 111 and the adapter microcomputer 302, which are the communication slaves at this time, determine whether or not they are designated as the communication counterpart in the P2P communication based on the slave designation data received by the broadcast communication. This determination result switches the communication modes of the camera microcomputer 205 and the designated communication slave (specific accessory apparatus) from the broadcast communication mode to the P2P communication mode. Since the adapter microcomputer 302 is designated herein as the communication counterpart in the next P2P communication, data is transmitted and received between the camera microcomputer 205 and the adapter microcomputer 302 in accordance with the procedure described in FIG. 5. Herein, one-byte data is transmitted from the camera microcomputer 205 to the adapter microcomputer 302, and then one-byte data is transmitted from the adapter microcomputer 302 to the camera microcomputer 205.

When the P2P communication ends between the camera microcomputer 205 and the adapter microcomputer 302, the camera microcomputer 205 can again designate a communication counterpart for the P2P communication by the broadcast communication. Herein, in order to designate the lens microcomputer 111 as the communication counterpart for the next P2P communication, the lens microcomputer 111 is set to the slave designation data, and the broadcast communication is executed according to the procedure described in FIG. 4. In response to this broadcast communication, the adapter microcomputer 302 ends the P2P communication, and at the same time, the communication modes of the camera microcomputer 205 and the lens microcomputer 111 are switched to the P2P communication mode. If no broadcast communication is executed at this stage, the P2P communication continues between the camera microcomputer 205 and the adapter microcomputer 302.

In the next P2P communication, data is transmitted and received between the camera microcomputer 205 and the lens microcomputer 111 in accordance with the procedure described in FIG. 5. Herein, the camera microcomputer 205 transmits two-byte data to the lens microcomputer 111, and then the lens microcomputer 111 transmits three-byte data to the camera microcomputer 205.

As described above, the broadcast communication can designate the communication counterpart for the P2P communication, and at the same time, and the broadcast communication and the P2P communication can be switched.

[Communication Control Processing]

Figure 7A:
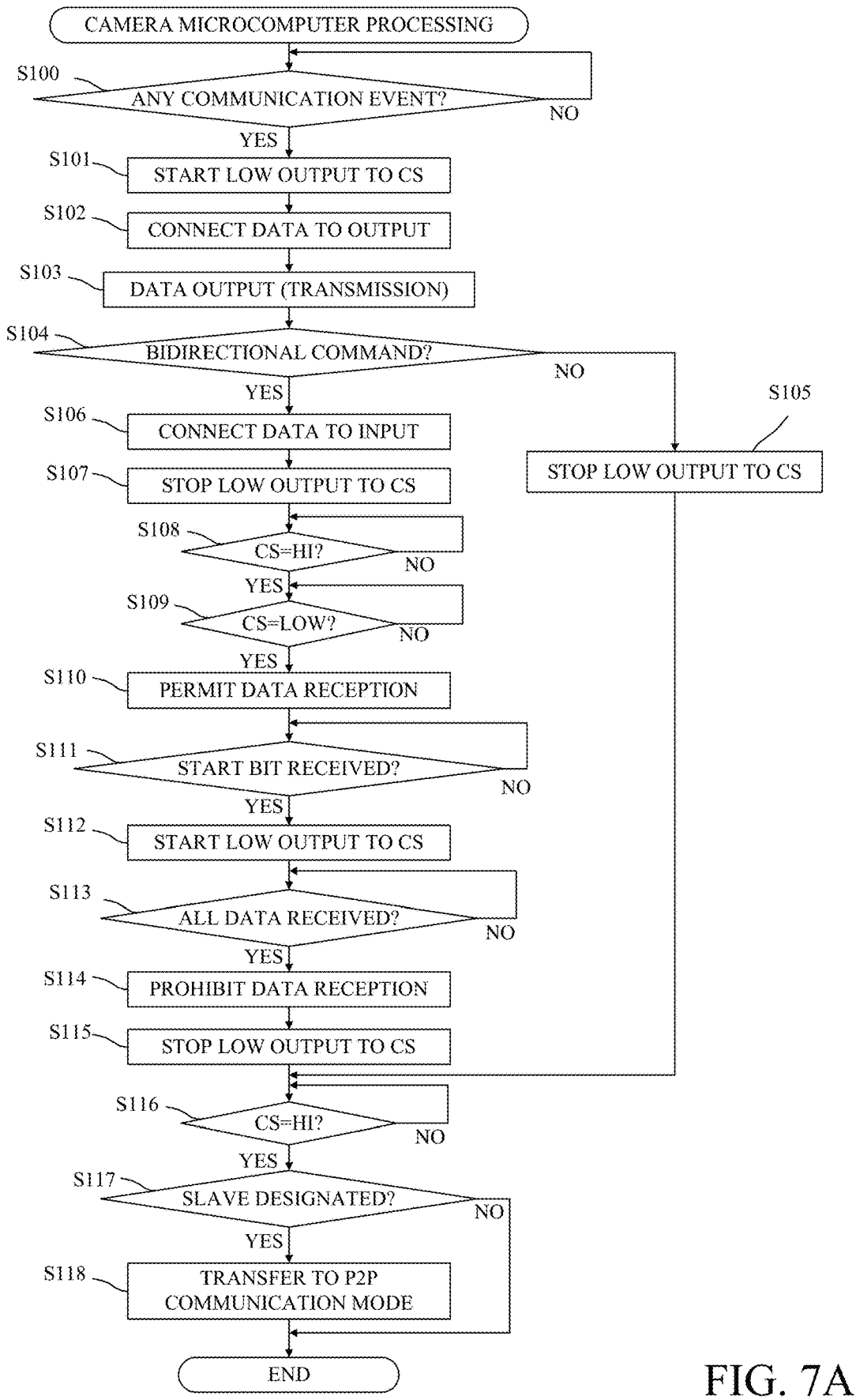
FIG. 7A is a flowchart illustrating processing of the camera body in the broadcast communication according to the first embodiment.
Figure 7B:
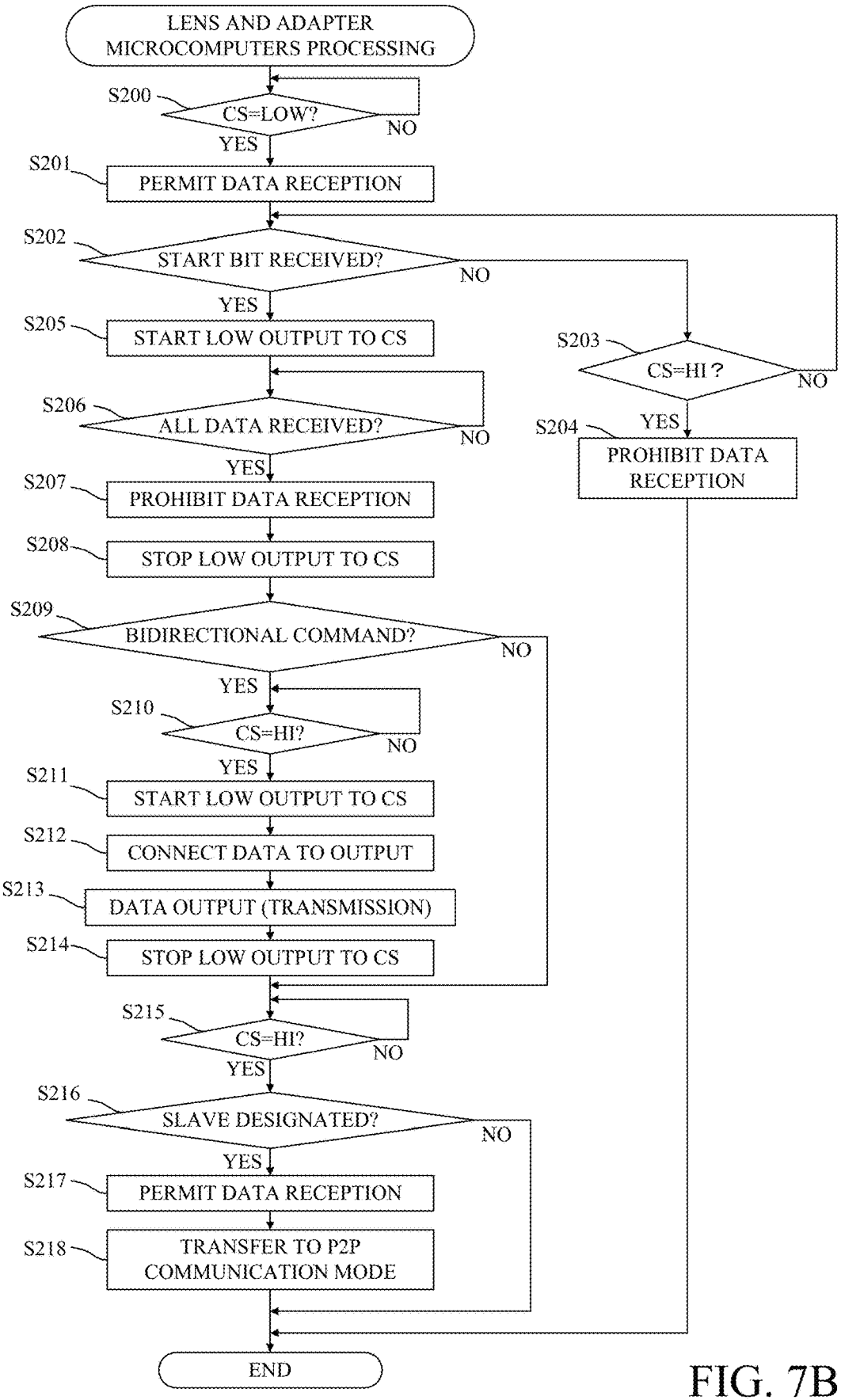
FIG. 7B is a flowchart showing processing of the interchangeable lens and the adapter in the broadcast communication according to the first embodiment.

A description will now be given of communication control processing performed among the camera microcomputer 205, the lens microcomputer 111, and the adapter microcomputer 302. Referring now to the flowchart in FIGS. 7A and 7B, a description will be given of processing in the broadcast communication mode. FIG. 7A illustrates processing performed by the camera microcomputer 205, and FIG. 7B illustrates processing performed by the lens microcomputer 111 and the adapter microcomputer 302. Each of the camera microcomputer 205, the lens microcomputer 111, and the adapter microcomputer 302, each of which includes the computer, executes this processing and other processing described later in accordance with a communication control program as a computer program.

When an event for starting the broadcast communication occurs in the step S100, the camera microcomputer 205 turns on (connects) the ground switch 2081 to put the signal line CS into low in the step S101. Thereby, the start of the broadcast communication is notified to the lens microcomputer 111 and the adapter microcomputer 302. The lens microcomputer 111 and the adapter microcomputer 302 that have detected the low level of the signal line CS in the step S200 permit the data reception from the signal line DATA in the step S201.

Next, the camera microcomputer 205 operates the input/output switch 2082 in the step S102 to connect the signal line DATA to the data output part, and performs the data transmission in the step S103. When detecting the start bit of the signal line DATA in the step S202, the lens microcomputer 111 and the adapter microcomputer 302 turns on (connects) the lens switch 1121 and the ground switch 3031 so as to indicate the ongoing communication processing in the step S205. Thereby, the low output to the signal line CS starts. Thereafter, when determining that all data has been received in the step S206, the lens microcomputer 111 and the adapter microcomputer 302 prohibit the data reception from the signal line DATA in the step S207. Further, in the step S208, the ground switch 1121 and the ground switch 3031 are turned off (disconnected) to indicate that the communication processing has ended, and the low output to the signal line CS is stopped. Herein, the number of bytes of data to be transmitted and received is not limited, as long as the camera microcomputer 205, the lens microcomputer 111, and the adapter microcomputer 302 has common recognitions.

Next, in the step S104, the camera microcomputer 205 determines whether the data transmitted in the step S103 is a bidirectional command including the transmission from the lens microcomputer 111 or the adapter microcomputer 302. If data is not the bidirectional command, the camera microcomputer 205 turns off (disconnects) the ground switch 2081 in the step S105 to stop the low output to the signal line CS, and proceeds to the step S116. If it is the bidirectional command, the camera microcomputer 205 operates the input/output switch 2082 in the step S106 to connect the signal line DATA to the data input part. In the step S107, the ground switch 2081 is turned off (disconnects) to stop the low output to the signal line CS, and it waits for the signal line CS to become high in the step S108.

On the other hand, in the step S209, the lens microcomputer 111 and the adapter microcomputer 302 determine whether the data received in the step S206 is the bidirectional command including the transmission from itself. If the data is not the bidirectional command, the lens microcomputer 111 and the adapter microcomputer 302 proceed to the step S215, and if the data is the bidirectional command, the lens microcomputer 111 and the adapter microcomputer 302 wait for the signal line CS to become high in the step S210. When the signal line CS becomes high, the lens microcomputer 111 and the adapter microcomputer 302 notify the start of the broadcast communication by turning on (connecting) the ground switches 1121 and 3031 and by putting the signal line CS into low in the step S211. When detecting the low level of the signal line CS in the step S109, the camera microcomputer 205 permits the data reception from the signal line DATA in the step S110.

Next, the lens microcomputer 111 and the adapter microcomputer 302 operate the input/output switches 1122 and 3032 in the step S212 to connect the signal line DATA to the data output part, and perform the data transmission in the step S213. When detecting the start bit of the signal line DATA in the step S111, the camera microcomputer 205 turns on (connects) the ground switch 2081 to indicate ongoing communication processing in the step S112. Thereby, the low output to the signal line CS starts. The lens microcomputer 111 and the adapter microcomputer 302 stop the low output to the signal line CS by turning off (disconnecting) the ground switches 1121 and 3031 in the step S214 after the transmissions of all data are completed.

If the camera microcomputer 205 determines that all data has been received in the step S113, it prohibits the data reception from the signal line DATA in the step S114. In the step S115, the camera microcomputer 205 turns off (disconnects) the ground switch 2081 to stop the low output to the signal line CS in order to indicate that the communication processing has ended. Herein, the number of bytes of data to be transmitted and received is not limited, as long as the camera microcomputer 205, the lens microcomputer 111, and the adapter microcomputer 302 have common recognitions.

Next, the camera microcomputer 205 waits for the signal line CS to become high in the step S116. When the signal line CS becomes high, the camera microcomputer 205 determines in the step S117 whether or not the lens microcomputer 111 or the adapter microcomputer 302 has been designated as a communication counterpart for the P2P communication based on the data transmitted in the step S103. If none of the lens microcomputer 111 and the adapter microcomputer 302 are designated as the communication counterparts, the camera microcomputer 205 ends the processing as it is, and if any is designated, the camera microcomputer 205 transfers to the P2P communication mode in the step S118.

On the other hand, the lens microcomputer 111 and the adapter microcomputer 302 stand by until the signal line CS becomes high in the step S215. When the signal line CS becomes high, in the step S216, the lens microcomputer 111 and the adapter microcomputer 302 determine whether or not they are designated as the communication counterpart for the P2P communication by the camera microcomputer 205, based on the data received in the step S206. If none of the lens microcomputer 111 and the adapter microcomputer 302 are designated as the communication counterparts, the processing ends. If it is designated as the communication counterpart, the designated microcomputer out of the lens microcomputer 111 and the adapter microcomputer 302 permits the data reception from the signal line DATA in the step S217, and transfers to the P2P communication mode in the step S218.

If the start bit is not detected in the step S202, the lens microcomputer 111 and the adapter microcomputer 302 confirm whether or not the signal line CS has become high in the step S203. When the signal line CS becomes high (returns to the high level), the lens microcomputer 111 and the adapter microcomputer 302 prohibit the data reception from the signal line DATA in the step S204 and end the processing. This is processing for a communication slave not designated as a communication counterpart for the P2P communication to respond to the low output to the signal line CS by the P2P communication between the camera microcomputer 205 and another communication slave.

Figure 8A:
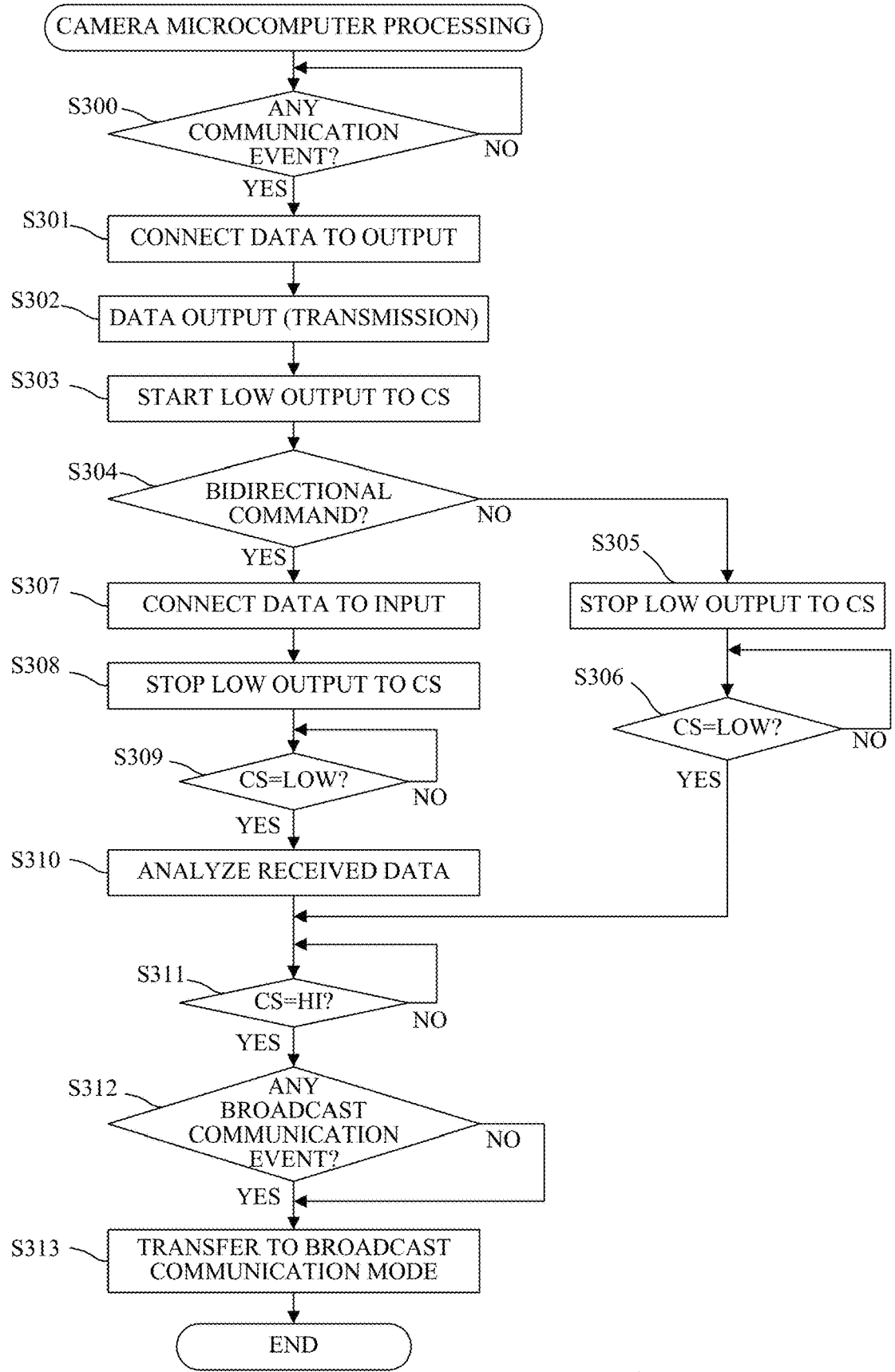
FIG. 8A is a flowchart illustrating processing of the camera body in the P2P communication according to the first embodiment.
Figure 8B:
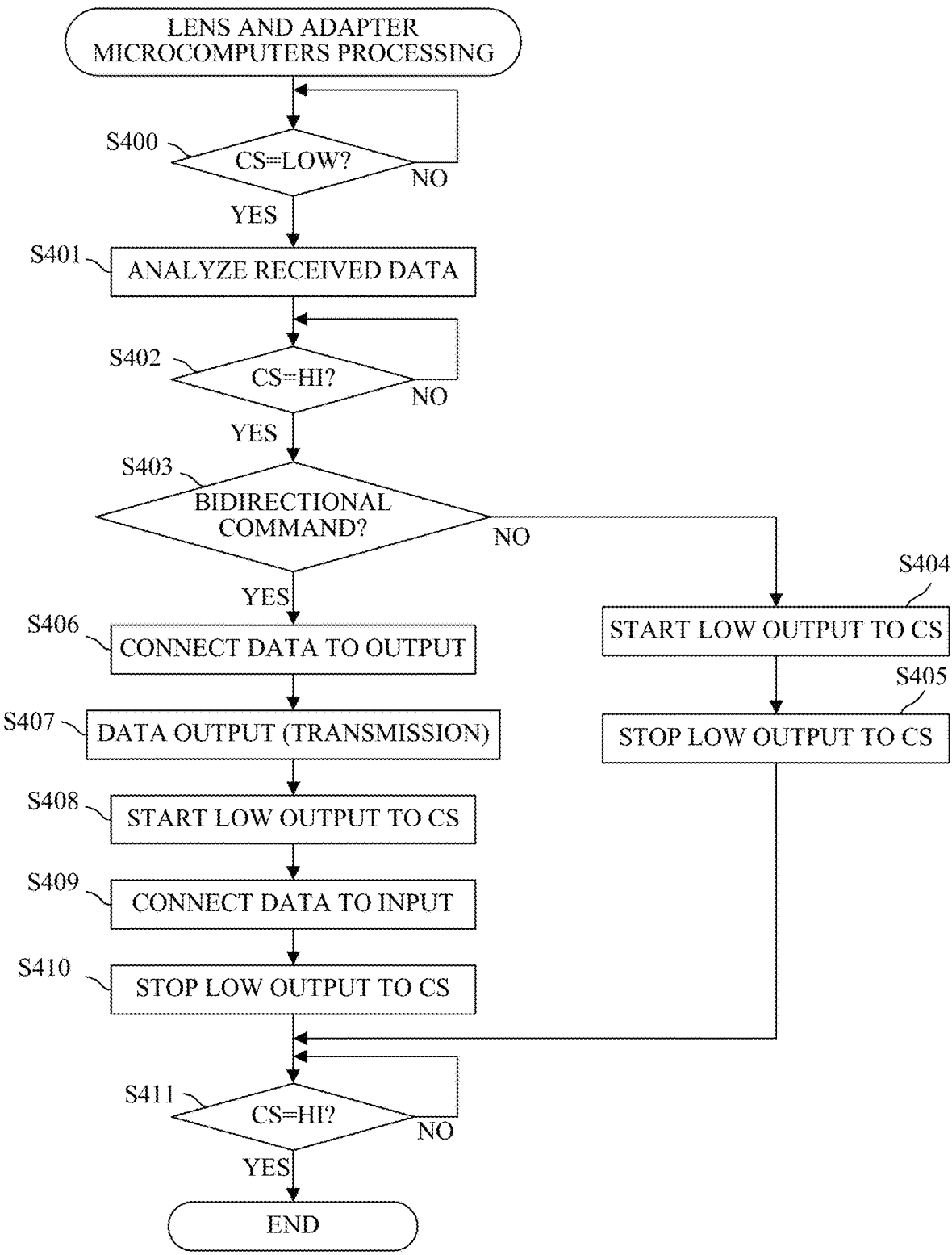
FIG. 8B is a flowchart illustrating processing of the interchangeable lens and the adapter in the P2P communication according to the first embodiment.

Referring now to flowcharts in FIGS. 8A and 8B, a description will be given of processing in the P2P communication mode. FIG. 8A illustrates processing performed by the camera microcomputer 205, and FIG. 8B illustrates processing performed by a microcomputer (referred to as a specific microcomputer hereinafter) designated as a communication counterpart for the P2P communication among the lens microcomputer 111 and the adapter microcomputer 302.

When an event for starting the P2P communication occurs in the step S300, the camera microcomputer 205 operates the input/output switch 2082 in the step S301 to connect the signal line DATA to the data output part, and performs the data transmission in the step S302. Thereafter, when all data transmissions are completed, the camera microcomputer 205 turns on (connects) the ground switch 2081 in the step S303 and starts the low output to the signal line CS. On the other hand, when the specific microcomputer detects the low level of the signal line CS in the step S400, it determines that the data transmission from the camera microcomputer 205 is completed, and analyzes the data received from the signal line DATA in the step S401.

Next, in the step S304, the camera microcomputer 205 determines whether the data transmitted in the step S302 is the bidirectional command including the transmission from the specific microcomputer. If it is not the bidirectional command, the camera microcomputer 205 turns off (disconnects) the ground switch 2081 in the step S305 to stop the low output to the signal line CS. In the step S306, it waits for the signal line CS to become high before proceeding to the step S311. If the data is the bidirectional command, the camera microcomputer 205 operates the input/output switch 2082 in the step S307 to connect the signal line DATA to the data input part. In the step S308, the ground switch 2081 is turned off (disconnected) to stop the low output to the signal line CS.

On the other hand, after waiting for the high level of the signal line CS in the step S402, the specific microcomputer determines in the step S403 whether the data received in the step S401 is the bidirectional command including the transmission from itself. If it is not the bidirectional command, the specific microcomputer turns on (connects) and turns off (disconnects) the ground switch (1121 or 3031) in the steps S404 and S405. Thereby, the low output to the signal line CS is started and stopped, and the flow proceeds to the step S411. In the bidirectional command, the specific microcomputer operates the input/output switch (1122 or 3032) in the step S406 to connect the signal line DATA to the data output part, and performs the data transmission in the step S407. Thereafter, when all data transmissions are completed, the specific microcomputer starts the low output to the signal line CS by turning on (connecting) the ground switch (1121 or 3031) in the step S408.

Next, when detecting the low level in the signal line CS in the step S609, the camera microcomputer 205 determines in the step S310 that the data transmission from the specific microcomputer has been completed, and analyzes the data received from the signal line DATA. On the other hand, in the step S409, the specific microcomputer operates the input/output switch (1122 or 3032) to connect the signal line DATA to the data input part. Thereafter, the specific microcomputer turns off (disconnects) the ground switch (1121 or 3031) in the step S410 to stop the low output to the signal line CS.

Next, the camera microcomputer 205 waits for the signal line CS to become high in the step S311. Thereafter, when an event for starting the broadcast communication occurs in the step S312, the camera microcomputer 205 transfers to the broadcast communication mode in the step S313. On the other hand, the specific microcomputer waits for the signal line CS to become high in the step S411 and ends the processing.

Thus, this embodiment properly switches the meaning (function) of the signal transmitted through the signal line CS between the broadcast communication and the P2P communication. Thereby, the camera microcomputer 205, the lens microcomputer 111, and the adapter microcomputer 302 can communicate with one another with the small number of signal lines (or channels).

[Authentication Communication Processing]

Figure 9:
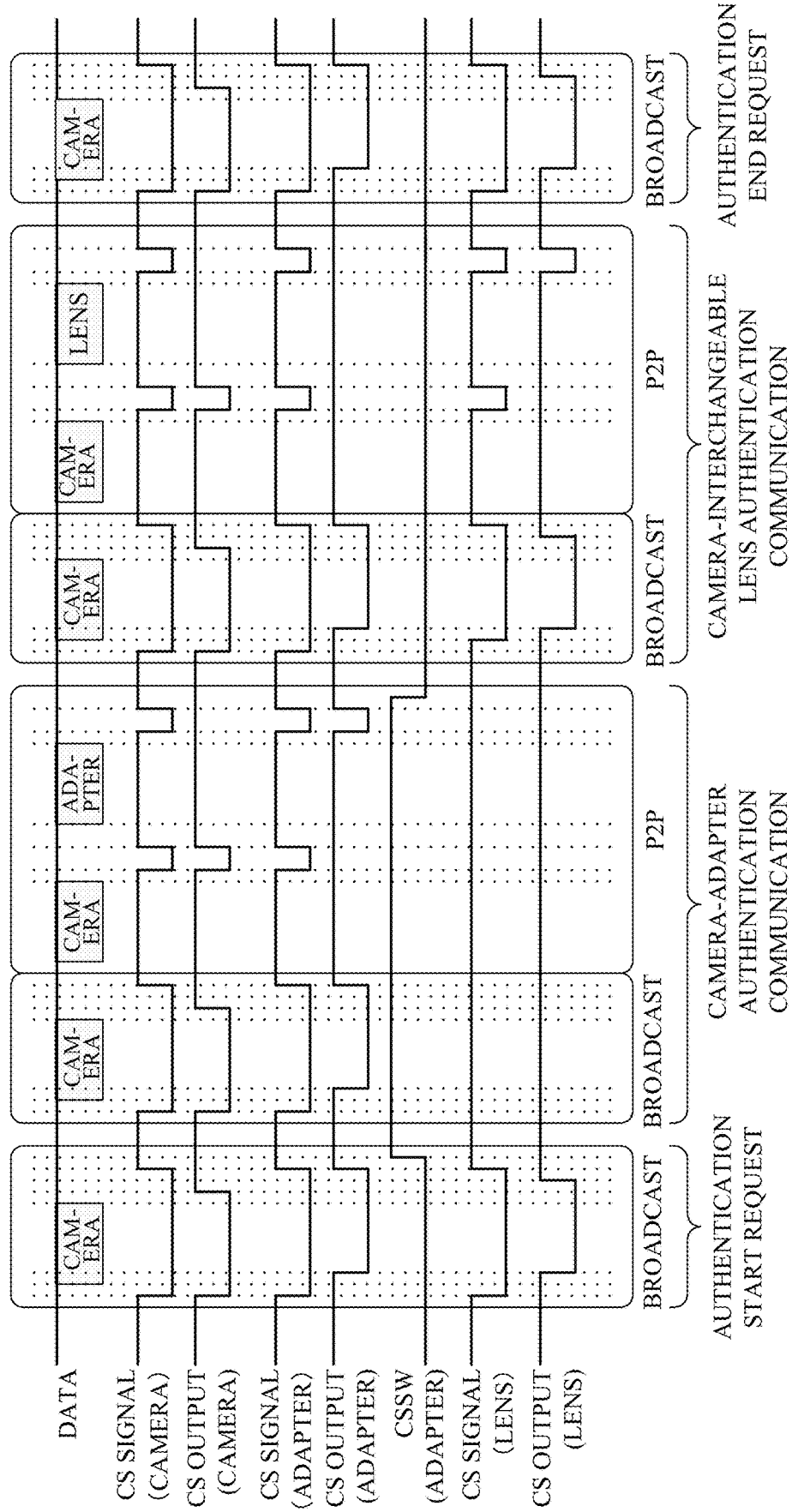
FIG. 9 is a diagram showing communication waveforms in authentication communication processing according to the first embodiment.
Figure 10:
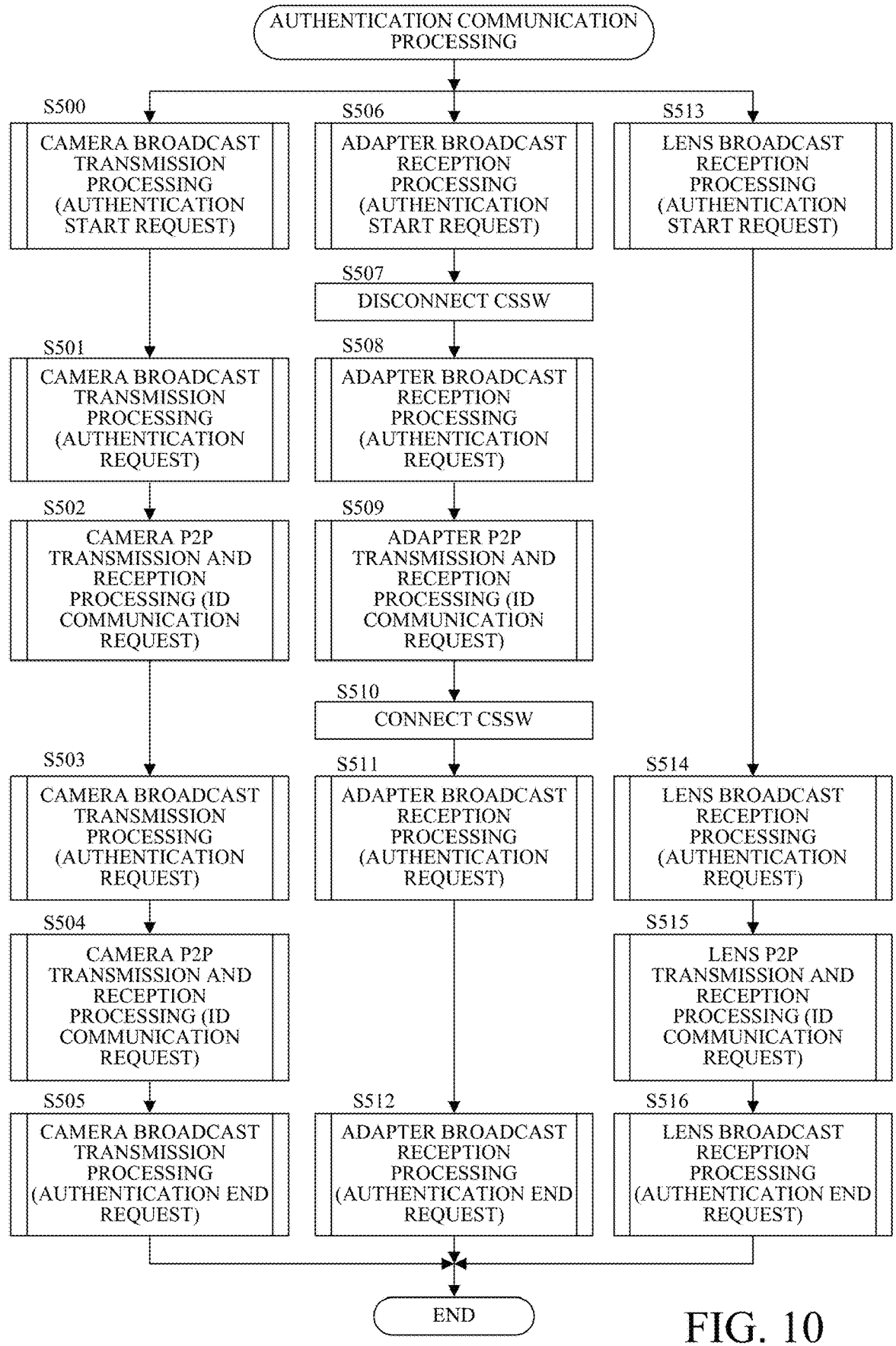
FIG. 10 is a flowchart showing authentication communication processing according to the first embodiment.

Referring now to FIGS. 9 and 10, a description will be given of authentication communication processing according to this embodiment. FIG. 9 illustrates signal waveforms in the authentication communication processing performed among the camera microcomputer 205, the lens microcomputer 111, and the adapter microcomputer 302.

The top of the figure illustrates data communicated by the signal line DATA, "Camera" indicates data output by the camera microcomputer 205, "Adapter" indicates data output by the adapter microcomputer 302, and "Lens" indicates data output from the microcomputer 111. "CS signal (camera)" indicates a signal output state (referred to as a CS signal state hereinafter) of the signal line CS detected by the camera microcomputer 205, and "CS output (camera)" indicates a signal output from the camera microcomputer 205 to the signal line CS. "CS signal (adapter)" indicates a CS signal state detected by the adapter microcomputer 302, and "CS output (adapter)" indicates a signal output from the adapter microcomputer 302 to the signal line CS. "CS SW" indicates the state of the CS switch 3033 controlled by the adapter microcomputer 302, and Low indicates the connection state. "CS signal (lens)" indicates a CS signal state detected by the lens microcomputer 111, and "CS output (lens)" indicates a signal output from the lens microcomputer 111 to the signal line CS.

A flowchart in FIG. 10 illustrates a flow of authentication communication processing. This authentication communication processing is performed when the power supply starts from the camera body 200 to the interchangeable lens 100 and the adapter 300 after the camera body 200 detects the connection of the interchangeable lens 100 through a lens detection switch 1123 provided in the camera body 200. At the start of the authentication communication processing, the camera microcomputer 205 transmits an authentication start request command via the signal line DATA by the broadcast communication in the step S500. In other words, the authentication start communication is performed. This processing is performed as a preprocess for the authentication communication by the camera microcomputer 205. At this time, the CS switch 3033 is set to the connected state. The processing in the broadcast communication and P2P communication performed later is as described with reference to FIGS. 7A, 7B, 8A, and 8B. As described above, the adapter microcomputer 302 and the lens microcomputer 111 output different signals (low and high) to the signal line CS between the ongoing communication with the camera microcomputer 205 (from a communication start to an end) and the communication standby in the broadcast communication and the P2P communication.

The adapter microcomputer 302 and the lens microcomputer 111 that have received the authentication start request command perform reception processing in the broadcast communication in the steps S506 and S513, respectively. If the received result is an authentication start request command, the adapter microcomputer 302 switches the CS switch 3033 to a disconnected state in the step S507. Herein, the switching timing of the CS switch 3033 is after the adapter microcomputer 302 stops the low output to the signal line CS (after the step S208 in FIG. 7B), but may be just before or simultaneous with stopping the low output.

Next, the camera microcomputer 205 sends an authentication request command via the communication line DATA in the step S501 when the adapter microcomputer 302 stops the low output to the signal line CS and the communication circuit is waiting for the communication. In other words, the authentication request communication is performed. In the subsequent processing, the camera microcomputer 205 performs the authentication communication. The authentication request command is slave designation data for designating as a designated slave (specific accessory apparatus) the communication slave that has received it through the broadcast communication. Since the communication line CS is disconnected by the CS switch 3033 in the step S507, the low output to the communication line CS in the step S501 is not detected by the lens microcomputer 111.

On the other hand, since the communication line DATA is connected, the authentication request command has been transmitted to the lens microcomputer 111. However, the authentication request command is a command premised on the broadcast communication in which data can be received only when the communication line CS is low. Hence, the lens microcomputer 111 that has received the authentication request command while the communication line CS is high ignores this command.

The adapter microcomputer 302 receives the authentication request command via the communication line DATA by the broadcast communication in the step S508. Since the adapter microcomputer 302 that has received the authentication request command has received the authentication request command for the first time, it is the slave designation data transmitted to itself, and determines that the next P2P communication is communication addressed to itself.

Next, in the step S502, the camera microcomputer 205 transmits an ID communication request command via the communication line DATA by the P2P communication. In other words, the authentication information communication is performed. At this time, the camera microcomputer 205 does not recognize that the communication counterpart of the P2P communication is the adapter microcomputer 302. This is because it is not yet known at this point how many accessories are connected to the camera body 200. The camera microcomputer 205 only knows that any of the connected communication slaves responds to the P2P communication by designating the designated slave by the authentication request command transmitted in the step S501.

In the step S509, the adapter microcomputer 302 designated as the designated slave receives the ID communication request command by the P2P communication, and in response, sends its own ID information (authentication information) to the camera microcomputer 205 via the signal line DATA by the P2P communication. Thereafter, the adapter microcomputer 302 switches the CS switch 3033 to the connected state in the step S510. Herein, the switching timing of the CS switch 3033 is after the adapter microcomputer 302 stops the low output to the signal line CS (after the step S410 in FIG. 8B), but it may be just before or simultaneous with the stop of the low output.

The P2P communication in the steps S502 and S509 may be performed only in one reciprocation between the camera microcomputer 205 and the adapter microcomputer 302 as illustrated in FIG. 9 or may be performed in two or more reciprocations.

Furthermore, although the timing for switching the CS switch 3033 to the connected state is after the step S509 in this flowchart, it may be before the step 509 (after the reception of the authentication request command in the step S508). This is because the adapter microcomputer 302 that has received the authentication request command by the broadcast communication recognizes that it is the slave designation data to itself, and the lens microcomputer 111 that has not received the authentication request command does not recognize that it is the slave designation data to itself. Hence, even when the CS switch 3033 is switched to the connected state after the step S508, only the adapter microcomputer 302 responds to the ID communication request command in the step S509.

Next, when the adapter microcomputer 302 stops the low output to the signal line CS and the communication circuit is waiting for the communication, the camera microcomputer 205 resends the authentication request command via the communication line DATA by the broadcast communication in the step S503. Herein, since the communication line CS is connected, the adapter microcomputer 302 receives the authentication request command in the step S511, and the lens microcomputer 111 also receives it in the step S514. However, the adapter microcomputer 302 has already finished the communication (or the authentication) in response to the authentication request command and the ID communication request command, and thus ignores the authentication request command at this stage. On the other hand, this is the first reception of the authentication request command for the lens microcomputer 111, the lens microcomputer 111 interprets it as the slave designation data to itself and prepares for the P2P communication.

Thereafter, the camera microcomputer 205 transmits the ID communication request command via the communication line DATA by the P2P communication in the step S504. Herein, the camera microcomputer 205 does not recognize that the counterpart of the P2P communication is the lens microcomputer 111. This is because of the same reason as that for the adapter microcomputer 302. In the step S515, the lens microcomputer 111 transmits its ID information (authentication information) to the camera microcomputer 205 via the signal line DATA by the P2P communication in response to the ID communication request command. When confirming that the received ID information is that of the interchangeable lens 100, the camera microcomputer 205 determines that no further communication slave to be authenticated is connected. Then, in the step S505, the camera microcomputer 205 transmits the authentication end request command for ending the authentication communication processing via the signal line DATA by the broadcast communication. In other words, the authentication end communication is performed. In the steps S512 and 516, the adapter microcomputer 302 and the lens microcomputer 111 receive an authentication end request command. Thereby, the authentication communication processing ends.

Thus, in this embodiment, the camera microcomputer 205 sequentially designates the designated slave using the broadcast communication whenever the CS output state indicates the ongoing standby of the communication, and performs the authentication communication using the broadcast communication and the P2P communication.

[Authentication Communication Processing Including Sleep Processing]

A description will now be given of a sleep communication performed between the camera microcomputer 205 and the adapter microcomputer 302. The camera microcomputer 205 can shift the adapter 300 from the normal operation state to the sleep state by transmitting a sleep request command described later to the adapter microcomputer 302 using the broadcast communication. The normal operation state of the adapter 300 (adapter microcomputer 302) is an operation state for performing processing in response to transmission data such as a transmission request command from the camera microcomputer 205, for example, transmissions of ID information and adapter data. In the following description, the operation of the adapter 300 in the normal operation state will be referred to as a normal operation.

On the other hand, the sleep state includes a first sleep state that returns to the normal operation state in response to a reception of the transmission data from the camera microcomputer 205, and a second sleep state that does not return to the normal operation state even when the transmission data is received and performs no processing in response to the transmission data. The second sleep state is maintained until the power supply from the camera body 200 is stopped (cut off), and is released when the stopped power supply is resumed.

The camera microcomputer 205 can transmit to the adapter microcomputer 302 a first sleep request command for shifting the adapter microcomputer 302 from the normal operation state to the first sleep state and a second sleep request command for shifting it to the second sleep state. When the camera microcomputer 205 determines that the normal processing of the adapter 300 is unnecessary, the camera microcomputer 205 transmits the second sleep request command to the adapter microcomputer 302 to prohibit the adapter 300 from performing the normal processing, and avoids the malfunctions and communication failures in the camera system.

Figure 11:
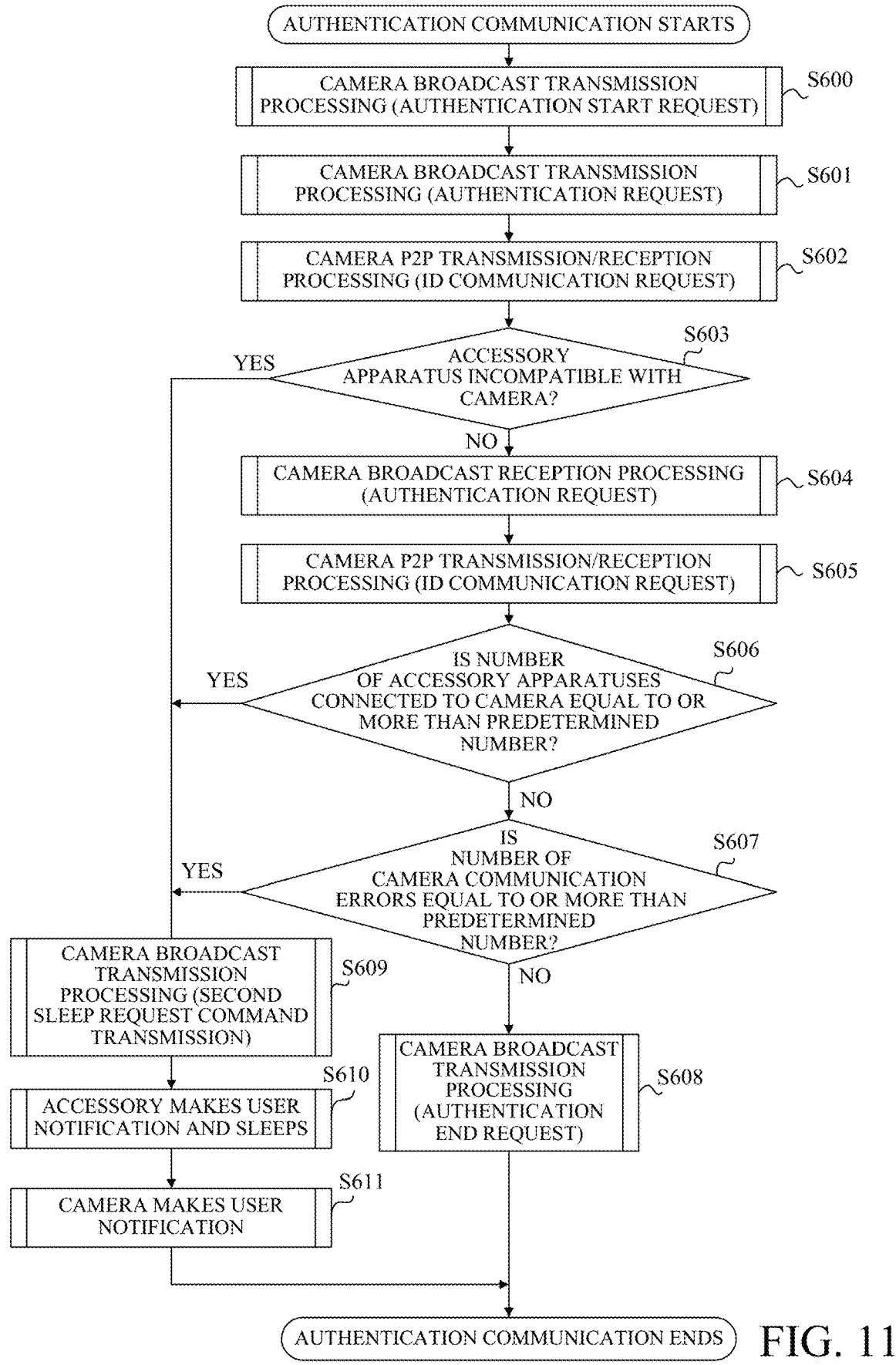
FIG. 11 is a flowchart showing adapter sleep processing according to the first embodiment of the present invention.

Referring now to a flowchart in FIG. 11, a description will be given of authentication communication processing including processing in which the camera microcomputer 205 shifts the adapter 300 (adapter microcomputer 302) from the normal operation state to the second sleep state. Processing from S600 to S602 is the same as the processing from S500 to S502 shown in FIG. 10, and a description thereof will be omitted.

In S603, the camera microcomputer 205 determines whether the adapter 300 is compatible with the camera body 200, based on the ID information acquired from the adapter 300 (adapter microcomputer 302) in S602. In other words, it determines whether or not the adapter 300 can communicate with the camera body 200 or can perform processing in response to a request command from the camera body 200. The camera microcomputer 205 proceeds to S609 if the adapter 300 is an incompatible adapter (incompatible accessory apparatus) that is not compatible with the camera body 200, and proceeds to S604 if the adapter 300 is a compatible adapter (compatible accessory apparatus). Thus, the camera microcomputer 205 specifies the adapter 300 as a sleep target accessory apparatus based on the ID information acquired from the adapter 300. Processing of S604 and S605 is the same as the processing of S503 and S504 shown in FIG. 10, respectively, and a description thereof will be omitted.

Next, in S606, the camera microcomputer 205 determines whether the total number of all accessory apparatuses (the interchangeable lens 100 and the adapter 300) connected to the camera body 200 is equal to or more than a predetermined number. If the total number of accessory apparatuses is equal to or more than the predetermined number, the camera microcomputer 205 proceeds to S609, and if not, proceeds to S607.

In S607, the camera microcomputer 205 determines whether the number of occurrences of communication errors is equal to or more than a predetermined number. The communication error occurs due to the disconnection of the communication line or the voltage noise. The communication having a format different from the predetermined format may be determined to be an error. The camera microcomputer 205 proceeds to S609 when the number of communication errors is equal to or more than the predetermined number, and proceeds to S608 when the number is less than the predetermined number. The processing of S608 is the same as the processing of S505 shown in FIG. 10, and a description thereof will be omitted. The camera microcomputer 205 that has completed the processing of S608 ends the authentication communication processing.

In S609, the camera microcomputer 205 transmits the second sleep request command to the adapter 300 (adapter microcomputer 302) as the sleep target accessory apparatus through the broadcast communication (first communication). Thereby, the adapter microcomputer 302 shifts from the normal operation state to the second sleep state after displaying or performing the user notification for notifying the user of shifting to the second sleep state in S610.

Next, in S611, the camera microcomputer 205 notifies the user that the adapter 300 has shifted to the second sleep state through the display unit 206 in the camera body 200 or by an audio output from an unillustrated speaker. Due to this user notification and the user notification by the adapter 300 in S609, the user can realize a cause of the operational failure of the adapter 300. In other words, the user can learn that the adapter 300 is incompatible with the camera body 200 or a number of adapters exceeding the permissible number (predetermined number) are attached to the camera body 200. Thus, the authentication communication processing ends.

As described above, this embodiment transmits the second sleep request command through the broadcast communication. Therefore, when a plurality of adapters are attached to the camera body 200 in a connected state, as described later, all of these adapters shift to the second sleep state. However, when the authentication communication is performed and the signal line CS is disconnected, the second sleep request command may be transmitted only to some of the plurality of adapters that are close to the camera body 200 so as to shift them to the second sleep state. In other words, the adapter that has received the second sleep request command gets connected to the signal line CS before shifting to the sleep state. Thereby, the camera microcomputer 205 can communicate with the adapter closer to the interchangeable lens 100 than the adapter that has shifted to the sleep state. Thus, the camera microcomputer 205 can perform the authentication start communication when it would like to transmit the sleep request command to only some of the plurality of adapters close to the camera body 200.

According to the first embodiment described above, the camera system that performs communications using two lines (two channels) or the signal line CS and the signal line DATA makes an authentication communication in order from the accessory apparatus closer to the camera body 200 by switching the CS switch 3033 provided in the adapter 300. Finally, the authentication communication with the interchangeable lens can be performed. Thereby, even when a plurality of accessory apparatuses are connected to the camera body 200, the authentication communication can be performed in a short time.

Moreover, when the adapter 300 is the incompatible adapter, or when a number of adapters exceeding the permissible number are attached to the camera body 200 or the communication errors frequently occur, the adapter can be shifted to the second sleep state even when it receives the data transmission. In other words, the normal operation of the adapter as the sleep target accessory apparatus can be prohibited. Thus, it is possible to avoid malfunctions, communication failures, and the like in the camera system including the sleep target accessory apparatus.

[Variation]

Next follows a description of a variation of the first embodiment. The first embodiment has described a case where the adapter 300 (the adapter microcomputer 302) is shifted to the first and second sleep states in the authentication communication among the camera microcomputer 205, the adapter microcomputer 302, and the lens microcomputer 111. However, the adapter 300 may be shifted to the first and second sleep states in a communication other than authentication communication among the camera microcomputer 205, the adapter microcomputer 302, and the lens microcomputer 111. In other words, when the camera microcomputer 205 performs the authentication communication or another specific communication while sequentially specifying the adapter microcomputer 302 and the lens microcomputer 111, it may shift the adapter 300 to the first and second sleep states.

ID information as the authentication information transmitted from the adapter microcomputer 302 and the lens microcomputer 111 to the camera microcomputer 205 in response to the ID communication request command may include information of a serial number for each type of accessory apparatus (such as 00 for the interchangeable lens and 01 for the extender). Moreover, the ID information may include information to which the meaning was allocated for every bit. It may contain information of a plurality of bytes. The ID information may be information indicating the type and function of the accessory apparatus.

The above authentication communication processing has described that the camera microcomputer 205 confirms that the ID information belongs to the interchangeable lens 100 and determines the end of the authentication communication. Alternatively, the ID information may include information indicating the interchangeable lens and information for instructing the end of the authentication communication, and the camera microcomputer 205 may detect it and determine the end of the authentication communication. In addition to the ID information communication, a confirmation communication for asking the communication slave about whether or not the authentication communication can be terminated may be separately performed by the P2P communication before and after the ID communication.

The first embodiment has described a single adapter 300 connected between the camera body 200 and the interchangeable lens 100, but allows a plurality of adapters connected in series. Even when a plurality of adapters are thus connected, it is possible to authenticate each adapter and the interchangeable lens 100 in a short time in the same procedure as that described in the first embodiment. At this time, the plurality of adapters that simultaneously receive the authentication start request command by the broadcast communication almost simultaneously set the CS switch to the disconnected state. Therefore, the subsequent authentication is always performed sequentially from the adapter closer to the camera body 200 one by one. Similar to the case where one adapter is connected, the interchangeable lens 100 is finally authenticated, and a series of authentication communication processing is completed.

When a plurality of adapters are connected and the same ID information is received from the plurality of adapters as described above (for example, when the user connects two adapters of the same model by mistake), the camera microcomputer 205 shifts one or all of the adapters to the second sleep state. This is because the camera microcomputer 205 cannot identify the adapter as the communication counterpart in this case, and cannot continue the communication with the adapter.

When the adapter 300 is not connected and the interchangeable lens 100 is directly connected to the camera body 200, the authentication communication is performed for the interchangeable lens 100 without performing part of the authentication communication for the adapter 300 in the authentication communication processing illustrated in FIGS. 9 and 10.

The adapter 300 in the first embodiment may be an extender as described above, an adapter including a drivable optical element (such as a focus lens, a diaphragm, and an image stabilization lens), or an adapter including a variety of sensors (a phase difference sensor, an angular velocity).

According to the description in the first embodiment, the camera microcomputer 205 can transmit to the adapter microcomputer 302 the first sleep request command for shifting the adapter 300 to the first sleep state, and the second sleep request command for shifting the adapter 300 to the second sleep state. However, the camera microcomputer 205 may transmit only the second sleep request command to the adapter microcomputer 302.

The camera microcomputer 205 may shift only a specific one of all the accessory apparatuses connected to the camera body 200 to the second sleep state by transmitting the sleep request command through the P2P communication. At this time, one of the first and second sleep states to be transferred may be selected according to the timing at which the adapter microcomputer 302 receives the sleep request command. Thereby, even if the camera microcomputer 205 can transmit only a single sleep request command, the adapter 300 can shift to the first and second sleep states.

The adapter microcomputer 302 may set the shifting timing to the second sleep state to a period from receiving the authentication start communication (starting the authentication communication) to receiving the authentication end communication (completing the authentication communication). Thereby, the camera microcomputer 205 that has received the authentication information can quickly shift the adapter 300 to the second sleep state.

The first embodiment has described the camera system having the signal transmission channel and the data communication channel. However, the present invention covers a camera system having only the data communication channel and configured to transmit the second sleep request command from the camera body to the adapter to shift the adapter from the normal operation state to the second sleep state.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The present invention can prohibit the sleep target accessory apparatus from performing processing in response to transmission data from the camera, and avoid malfunctions or communication failures in the image pickup system.

What is claimed is:

1. A camera usable while one or more accessory apparatuses are connected to the camera, the camera comprising:
   a camera communication unit connected to a data communication channel used for a data communication between the camera and the one or more accessory apparatuses; and
   a camera controller configured to perform the data communication with the one or more accessory apparatuses via the data communication channel,
   wherein the camera controller transmits to at least one sleep target accessory apparatus among the one or more accessory apparatuses which are selected based on authentication information, a sleep request command for shifting the sleep target accessory apparatus from an operation state for performing processing in response to a data transmission from the camera to a sleep state that does not perform the processing regardless of the data transmission,
   wherein the camera controller:
   performs, as the data communication, a first communication that is a communication without designation of communication counterpart and a second communication that is a communication between the camera and a specific accessory apparatus as a designated communication counterpart; and transmits the sleep request command to the sleep target accessory apparatus through the first communication, wherein the camera communication unit is connected to a signal transmission channel provided separately from the data communication channel, and used to transmit a signal between the camera and the one or more accessory apparatuses, and wherein the camera controller:
performs an authentication communication with the specific accessory apparatus using the first communication and the second communication whenever receiving a signal indicating an ongoing standby of the first communication from each accessory apparatus via the signal transmission channel, while sequentially designating the specific accessory apparatus using the first communication, and specifies the sleep target accessory apparatus based on the authentication information obtained from each specific accessory apparatus by the authentication communication.

2. The camera according to claim 1, wherein the processing is a data transmission to the camera.

3. The camera according to claim 1, wherein the sleep request command is a command that causes the sleep target accessory apparatus to maintain the sleep state until power supply from the camera is stopped.

4. The camera according to claim 3, wherein the camera controller returns the sleep target accessory apparatus to the operation state by resuming the power supply.

5. The camera according to claim 1, wherein the camera controller transmits the sleep request command to the sleep target accessory apparatus when the number of accessory apparatuses is larger than a predetermined number.

6. The camera according to claim 1, wherein the camera controller transmits the sleep request command to the sleep target accessory apparatus when the number of communication errors generated with the sleep target accessory apparatus is larger than a predetermined number.

7. The camera according to claim 1, wherein the camera controller notifies a user that the sleep target accessory apparatus has shifted to the sleep state.

8. The camera according to claim 1, wherein the one or more accessory apparatuses include an interchangeable lens apparatus, and an adapter apparatus connected between the interchangeable lens apparatus and the camera, and wherein the sleep target accessory apparatus is the adapter apparatus.

9. An accessory apparatus connectable to a camera usable while one or more accessory apparatuses are connected to the camera, the accessory apparatus comprising:

an accessory communication unit connected to a data communication channel used for a data communication between the camera and the one or more accessory apparatuses; and an accessory controller configured to performs the data communication with the camera via the data communication channel, wherein when receiving a sleep request command transmitted from the camera based on authentication information of the accessory apparatus, the accessory controller shifts from an operation state for performing processing in response to a data transmission from the camera to a sleep state that does not perform the processing regardless of the data transmission, wherein the accessory controller:
performs, as the data communication, a first communication that is a communication without designation of communication counterpart and a second communication that is a communication between the camera and the accessory apparatus as a designated communication counterpart; and receives the sleep request command through the first communication, wherein the accessory communication unit is connected to a signal transmission channel provided separately from the data communication channel, and used to transmit a signal between the camera and the one or more accessory apparatuses, and wherein the accessory controller:
outputs a signal indicating an ongoing standby of the first communication to the signal transmission channel, and performs an authentication communication with the camera using the first communication and the second communication when designated as the specific accessory apparatus using the first communication from the camera that has received the signal.

10. The accessory apparatus according to claim 9, wherein the processing is a data transmission to the camera.

11. The accessory apparatus according to claim 9, wherein the accessory controller maintains the sleep state until power supply from the camera is stopped.

12. The accessory apparatus according to claim 11, wherein the accessory controller returns to the operation state when the power supply is resumed.

13. The accessory apparatus according to claim 9, wherein the accessory controller notifies a user that the accessory controller has shifted to the sleep state.

14. The accessory apparatus according to claim 9, wherein the one or more accessory apparatuses include an interchangeable lens apparatus, and an adapter apparatus connected between the interchangeable lens apparatus and the camera, and wherein each accessory apparatus is the adapter apparatus.

15. A control method for a camera usable while one or more accessory apparatuses are connected to the camera and configured to perform a data communication with the one or more accessory apparatuses via a data communication channel, the control method comprising the steps of:

causing the camera to acquire authentication information from the one or more accessory apparatuses; and causing the camera to transmit to at least one sleep target accessory apparatus among the one or more accessory apparatuses which are selected based on the authentication information, a sleep request command for shifting the sleep target accessory apparatus from an operation state for performing processing in response to a data transmission from the camera to a sleep state that does not perform the processing regardless of the data transmission, wherein the control method further includes the steps of:
causing the camera to perform, as the data communication, a first communication that is a communication without designation of communication counterpart and a second communication that is a communication between the camera and a specific accessory apparatus as a designated communication counterpart; and causing the camera to transmit the sleep request command to the sleep target accessory apparatus through the first communication, wherein a signal transmission channel is provided separately from the data communication channel, and used to transmit a signal between the camera and the one or more accessory apparatuses, and wherein the control method further includes the steps of:

causing the camera to perform an authentication communication with the specific accessory apparatus using the first communication and the second communication whenever receiving a signal indicating an ongoing standby of the first communication from each accessory apparatus via the signal transmission channel, while sequentially designating the specific accessory apparatus using the first communication, and causing the camera to specify the sleep target accessory apparatus based on the authentication information obtained from each specific accessory apparatus by the authentication communication.

16. A control method for an accessory apparatus connectable to a camera usable while one or more accessory apparatuses are connected to the camera, and configured to perform a data communication with the camera via a data communication channel, the control method comprising the steps of:

causing the accessory apparatus to transmit authentication information; and causing the accessory apparatus to shift, when receiving a sleep request command transmitted from the camera based on the authentication information of the accessory apparatus, from an operation state for performing processing in response to a data transmission from the camera to a sleep state that does not perform the processing regardless of the data transmission, wherein the control method further includes the steps of:

causing the accessory apparatus to perform, as the data communication, a first communication that is a communication without designation of communication counterpart and a second communication that is a communication between the camera and the accessory apparatus as a designated communication counterpart; and causing the accessory apparatus to receive the sleep request command through the first communication, wherein a signal transmission channel is provided separately from the data communication channel, and used to transmit a signal between the camera and the one or more accessory apparatuses, and wherein the control method further includes the steps of:

causing the accessory apparatus to output a signal indicating an ongoing standby of the first communication to the signal transmission channel, and causing the accessory apparatus to perform an authentication communication with the camera using the first communication and the second communication when designated as the specific accessory apparatus using the first communication from the camera that has received the signal.

17. A non-transitory computer-readable storage medium that stores a control program that causes a computer in a camera usable while one or more accessory apparatuses are connected to the camera, to operate in accordance with the control method according to claim 15.

18. A non-transitory computer-readable storage medium that stores a control program that causes a computer in an accessory apparatus connectable to a camera usable while one or more accessory apparatuses are connected to the camera, to operate in accordance with the control method according to claim 16.

* * * * *